United States Patent [19]
Knupp

[11] Patent Number: 5,966,672
[45] Date of Patent: Oct. 12, 1999

[54] VISUALIZATION TECHNOLOGY METHOD

[76] Inventor: Daniel F. Knupp, 12266 Huntington Venture, Houston, Tex. 77099

[21] Appl. No.: 08/901,810

[22] Filed: Jul. 28, 1997

[51] Int. Cl.⁶ .................................................. G06F 19/00
[52] U.S. Cl. ............................................................ 702/16
[58] Field of Search .............................. 702/14, 16, 17; 367/68, 71, 72, 73

[56] References Cited

U.S. PATENT DOCUMENTS

| | | | |
|---|---|---|---|
| H1693 | 11/1997 | Thornton et al. | 702/17 |
| 4,633,402 | 12/1986 | Flinchbaugh . | |
| 4,672,545 | 6/1987 | Lin et al. . | |
| 4,727,488 | 2/1988 | Flinchbaugh . | |
| 4,764,904 | 8/1988 | Salomonsen et al. . | |
| 4,779,237 | 10/1988 | Bodine . | |
| 4,964,103 | 10/1990 | Johnson . | |
| 5,018,112 | 5/1991 | Pinkerton et al. . | |
| 5,198,979 | 3/1993 | Moorhead et al. . | |
| 5,513,150 | 4/1996 | Sicking et al. . | |
| 5,583,825 | 12/1996 | Carrazzone et al. | 702/17 |

*Primary Examiner*—Donald E. McElheny, Jr.
*Attorney, Agent, or Firm*—Alton W. Payne

[57] ABSTRACT

A method for imaging volume data having an embedded target of interest is provided. The method provides for acquiring data concerning the target and preparing the data for identifying an event associated with the target such that the event is viewable without distortion. The data is prepared by capturing relevant amplitude and phase data with respect to the relevant event, and imaging or migrating the data to place the event in the correct position. Further, the data is calibrated to a known model by tying the amplitude captured from the data to an amplitude of the known model, and analyzing the dynamic range of the model data and the captured data to confirm alignment. If alignment is not acceptable, additional calibration is performed. The data is scaled to emphasize the event such that the data can be viewed and the event associated with the data are readily discernible. The volume event and embedded event are plotted in either log amplitude scale format or linear amplitude scale format. If it is sufficient to evaluate the event in question in fewer colors, the event is visualized in 8-bit data format. If it is required to preserve more amplitude data, it is preferable to visualize the event in dynamic range data format.

17 Claims, 17 Drawing Sheets

VOXELIZED REPRESENTATION
OF A SEISMIC WAVEFORM
(i.e. A STACK OF COLOR VOXELS).

SCHEMATIC REPRESENTATION
OF A SINGLE VOLUME PIXEL
ELEMENT (VOXEL) WITH ALPHA ($\alpha$)
OPACITY PROPERTIES HISTOGRAM OF SEISMIC AMPLITUDES SHOWING DISTRIBUTION OF DATA VALUES AFTER 8-BIT VOXELIZATION, OPACITY RANGES FROM 0 TO 1, WITH 1 BEING FULLY OPAQUE

RELATIVE AMPLITUDE 1D SYNTHETIC SEISMIC

EXAMPLE FOR AMPLITUDE MATCHING SYNTHETIC AND REAL DATA

NORMAL DATA DISTRIBUTION FOR DYNAMICALLY SCALED DATA

VISUALIZATION TECHNOLOGY METHOD

FIELD OF THE INVENTION

The present invention relates generally to a visualization technology method. Specifically, the present invention relates to a method which determines the scalars and color signatures for seismic or other events of interest, and optimizes the dynamic range of the amplitudes representing those events. More particularly, the present invention optimizes scaling of the objective amplitudes for revealing the most subtle color changes possible in the waveform over selected time intervals of interest.

BACKGROUND OF THE INVENTION

Computer graphics has always been a valuable tool to study scientific problems. In the past, however, the lack of graphics power limited its usefulness. The recent emphasis on visualization started around 1987 when high end computer graphics first became available. Today, the advent of volume visualization not only enables the geoscientist to see and work with their data in its natural 3-D form, it also brings a new level of understanding. Visualization provides the medium and opportunity to integrate technologies such that the greatest amount of information can be accurately, efficiently, and economically obtained in the search for hydrocarbons, if properly used.

There are many techniques for displaying various data types. Line charts can be used to represent 1-D scalar data, and scatter plots or 2-D contours can be used to image 2-D data. For 3-D images, structure fields or 2-D contours over planar slices can be used, or 3-D can be represented using isosurfaces. Traditionally, the visualization of three-dimensional data has been accomplished using geometric models, due to limitations in available compute power. This polygonal geometry rendering technology has been around for over a decade, and was designed specifically to provide interactive imagery of geometric constructs created on a computer, such as a wireframe CAD surface model. The images generated by these techniques were based on models that consisted of geometrically described surfaces oriented in 3-D space.

Volume rendering, however, allows the display of information throughout a regularly gridded 3-D space. The basic idea in volume rendering is to cast rays from screen pixel positions through the data, obtain the desired information along the ray, and then display this information in a format meaningful to the computer users (i.e., colors). The data visualized can be an average of the data in a cell ("voxel"), or of all cells intersected by the ray (i.e., optical stacking), or some other such measure computed for various orientations and parameter settings.

The traditional way to interpret three-dimensional seismic data cubes was by viewing a series of 2-D images ("slices"), digitizing them, and making 3-D structural maps. Given today's pressure on timeliness and cost-effective outcomes, 3-D volume imaging is an extremely valuable exploration tool for accelerating the seismic interpretation processes and eliminating uncertainty in structural and stratigraphic features; thus obtaining better insight needed to make informed drill location decisions promptly.

Surface Rendering -vs- Volume Rendering

FIGS. 1 and 2 illustrate the conceptual differences between 3-D surface visualization and 3-D volume visualization. 3-D volume rendering is an efficient tool for visualizing vast amounts of data. It is one of the techniques used in the field of scientific visualization, which is defined as the extraction of meaningful information from complex data sets through the use of interactive graphics. Volume rendering generates images from volume data sets which consist of information defining the attributes of a model or recorded data volume, not only at surfaces, but inside the samples also.

Voxelized data sets are made up of cubic voxels (three-dimensional VOlume piXELS) in much the same way a computer screen is made up of rectangular pixels (picture elements). In the computer graphics domain, each voxel is treated like an object. Information about the characteristics of the each voxel is stored within the voxel's binary descriptor string, as part of the data format.

FIG. 3 illustrates the concept of a single Voxel, which represents a data sample as a unit cube having six sides, with an internal amplitude value (A), and opacity value (alpha). The cube can be represented in any orientation, and opacity can be set to make the voxel either completely transparent, or opaque on each face.

FIG. 4 is a voxelized representation of a seismic wavelet. Voxels of various colors are stacked vertically with colors representing the seismic sample magnitudes. A single seismic trace is a series of connected waveforms, which therefore would be represented by a larger column of voxels as depicted in FIG. 2.

In a 3-D seismic data volume, there can be millions of traces of data, arranged in a regular gridded fashion, with thousands of samples recorded over the time interval. Thus, an entire seismic volume might contain billions of Voxels. FIG. 5 is a statistical histogram illustrating the distribution of amplitude (or attribute) values within the entire 3-D volume. The histogram is an alternate representation of all the volume samples, as they are related to the absolute count of each color value through statistical binning.

Deciding just how to display a 3-D voxelized seismic data set to render a meaningful image is generally considered the central problem with visualization technology. There are many possible methods to represent data, and many issues must be considered. For example, interactively, efficiency, optical effects, volume composition, color, orientation, data integrity, integration, scaling, computing architecture, as well as artistic expressiveness must all be considered.

Visualization techniques that make the most efficient use of the human perceptions to increase the data bandwidth between the computer and the user allow users to comprehend and analyze data at greatly enhanced rates. The techniques that provide the highest bandwidth are ones establishing interaction to develop feedback loops. Thus, the objective is to simultaneously leverage the interpretive strengths of the users and the computational strengths of the computers to achieve the most operational efficiency.

A major goal for all 3-D interpreters is to devise an efficient process by which critical information can be quickly and reliably extracted from the 3-D seismic volume, and correlated to predefined well-log data and synthetic models. However, when dealing with integrated 3-D seismic visualization techniques, the key to successful and efficient projects resides in the early planning stages of data acquisition and processing, as well as depending on an integrated computing environment which maintains superior data integrity, and allows for flexible data access and preparation procedures.

Additionally, the most information, and best representation of data, can generally be achieved by integrating many disciplines, or areas, such as computer graphics, image processing, art, technical expertise, the human-computer interface, cognition, and perception. A particularly interesting aspect of visualization is that it is best performed by integrated teams, which might consist of scientists, engineers, computer experts, and artists, equipped with appropriate computing resources and integrated work environment.

Seismic Visualization

Seismic data visualization technology allows the geophysicist to interactively manipulate data volumes in a true 3-D fashion using today's powerful computer graphics technology. One of the most important tangible benefits of using visualization technology has been the ability to locate subtle hydrocarbon traps which have gone undetected in highly drilled and mature fields. Some of the most evident intangible benefits of this technology include improved communications between geoscientist, and it aids in the integration of computer technology with geophysics, geology and reservoir engineering.

FIGS. 6 and 7 illustrate the types of images that can be rendered using modern integrated visualization and interpretation technology. However, to reach this high plateau of visualization technology, much preparation is required, and various technologies must be effectively carried out and integrated to correctly extract and comprehend the most information. In FIG. 6, bright spots are revealed in their correct spatial relationship when the opacity of individual seismic amplitudes is selectively controlled. Thus, it is possible to create a visual representation of all the amplitude anomalies in the volume at a single time, (i.e. floating clouds). Interpreted surfaces are also shown within the volume along with properly positioned well-log data. FIG. 7 illustrates the function of opacity filtering, and displays a surface that might be seed detected from the amplitude data directly.

Interactive volume rendering makes it easy to quickly explore the surface and internal details of a volume of data and examine relationships among the structures and other attributes. Key features in Voxel visualization include: exact measurement capabilities, lighting and texturing properties, volume orientation, pseudo-coloring, opacity control, and multi-channel rendering. Unlike conventional geometric object visualization, the resulting volumetric segmentation retain a greater level of detail and much more information than would be available from visualizing a simple geometric surface. The implementation of an integrated visualization program, must be designed to minimize drilling risks through multidiscipline integration, and decrease project cycle times by careful planning, while maximizing computing resource efficiency with close integration of all technical components.

The present invention provides a methodology which uniquely integrates technology to eliminate most drilling risk by extracting more information from 3-D seismic data, and models, than has previously been possible using conventional techniques, and ultimately, locating 90% or more of all commercial reserves within a 3-D survey, using procedures requiring less than $1/20^{th}$ the amount of time compared to conventional 3-D prospect generation methods.

Maximizing Image Quality

There are several key data preparation techniques which produce the clearest images, free from distracting aliasing artifacts, and low dynamic range limitations. First, the transition of values adjacent to one another should be smooth. Data volumes or functions with discontinuities or very abrupt transitions introduce sharp transitions in the whole data volume which might be too sharp for rendering a properly sampled image. The results are aliasing, jagged boundaries and suspicious patterns in the rendered image that may be difficult to separate from the information being sought in the real data.

Another technique is to filter the data before converting data into a voxel elements, using higher quality signal processing filters and interpolation programs, before scaling and loading. Amplitude Scaling should also be performed outside the voxel domain, otherwise it can only be scaled using image viewing transformation modules. Reasons for pre-filtering include better/higher quality bilinear reconstruction filters can be used before data conversion to give higher-resolution, and the amplitudes can be more carefully scaled using the original 32-bit information and higher quality scaling programs. Also, rendered images are limited by the number of samples in the volume, thus large magnification factors can produce visible aliasing artifacts on small data volumes. Interpolating and re-scaling the volume with a high-quality filter before data conversion and image rendering can usually resolve or minimize these problem.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a visualization technology method is provided which determines the scalars and color signatures for seismic or other events of interest, and optimizes the dynamic range of the amplitudes representing those events such that scaling of the objective amplitudes is optimized for revealing the most subtle color changes possible in the waveform over selected time intervals of interest.

The method of the present invention provides a method for imaging volume data of a structure having a target of interest. In one embodiment the method includes the steps of acquiring data concerning the target, preparing the data for identifying an event associated with the target, calibrating the data to a known model, and scaling the data to emphasize the event such that the data can be viewed and the event associated with the data are readily discernible.

In another embodiment, the method for imaging volume data of a structure having a target of interest comprises acquiring data concerning the target. The data is prepared for identifying an event associated with the target such that the event is viewable without distortion, and capturing relevant amplitude and phase data with respect to the relevant event. Also, the data is prepared by imaging or migrating the data for placing the event in the correct position. The data is calibrated to a known model by tying the amplitude captured from the data to an amplitude of the known model, and analyzing the dynamic range of the model data and the captured data to confirm alignment. If alignment is not acceptable, additional calibration is performed. Then, the data is scaled to emphasize the event within the data when viewed such that the event is readily discernible.

In yet another embodiment, the method for imaging volume data of a structure having a target of interest provides for acquiring data concerning the target and preparing the data for identifying an event associated with the target such that the event is viewable without distortion. The data is also prepared by capturing relevant amplitude and phase data with respect to the relevant event, and imaging or migrating the data to place the event in the correct position. Further, the data is calibrated to a known model by tying the amplitude captured from the data to an amplitude of the known model, and analyzing the dynamic range of the model data and the captured data to confirm alignment. If alignment is not acceptable, additional calibration is performed. The data is scaled to emphasize the event such that the data can be viewed and the event associated with the data are readily discernible. The event is plotted in either log data format or seismic data format. If it is sufficient to evaluate the event in question in fewer colors, the event is visualized in 8-bit data format. If it is required to preserve more amplitude data, it is preferable to visualize the event in dynamic range data format.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Calibrated Visualization Procedures

When performing "calibrated visualization" using Voxel technology, the objective is to determine the color signature which represents the geologic objective waveform within certain time intervals. Thereby, a calibrated quantitative measurement is devised to identify and visualize specific targets. Also, by using geophysical and petrophysical modeling techniques, subtle changes in 3-D amplitudes can often be accurately related to reservoir fluid content, or changes in physical properties such as in reservoir porosity, sand percentage thickness, and other lithologic variables. Model data must also be tied and scaled to match the seismic amplitudes. Then, seismic samples and model data are voxelized with predetermined color signatures associated with key geologic events at specific times, where the relevant color signatures are parameterized to indicate physical rock, and/or fluid property changes.

Figure 8:
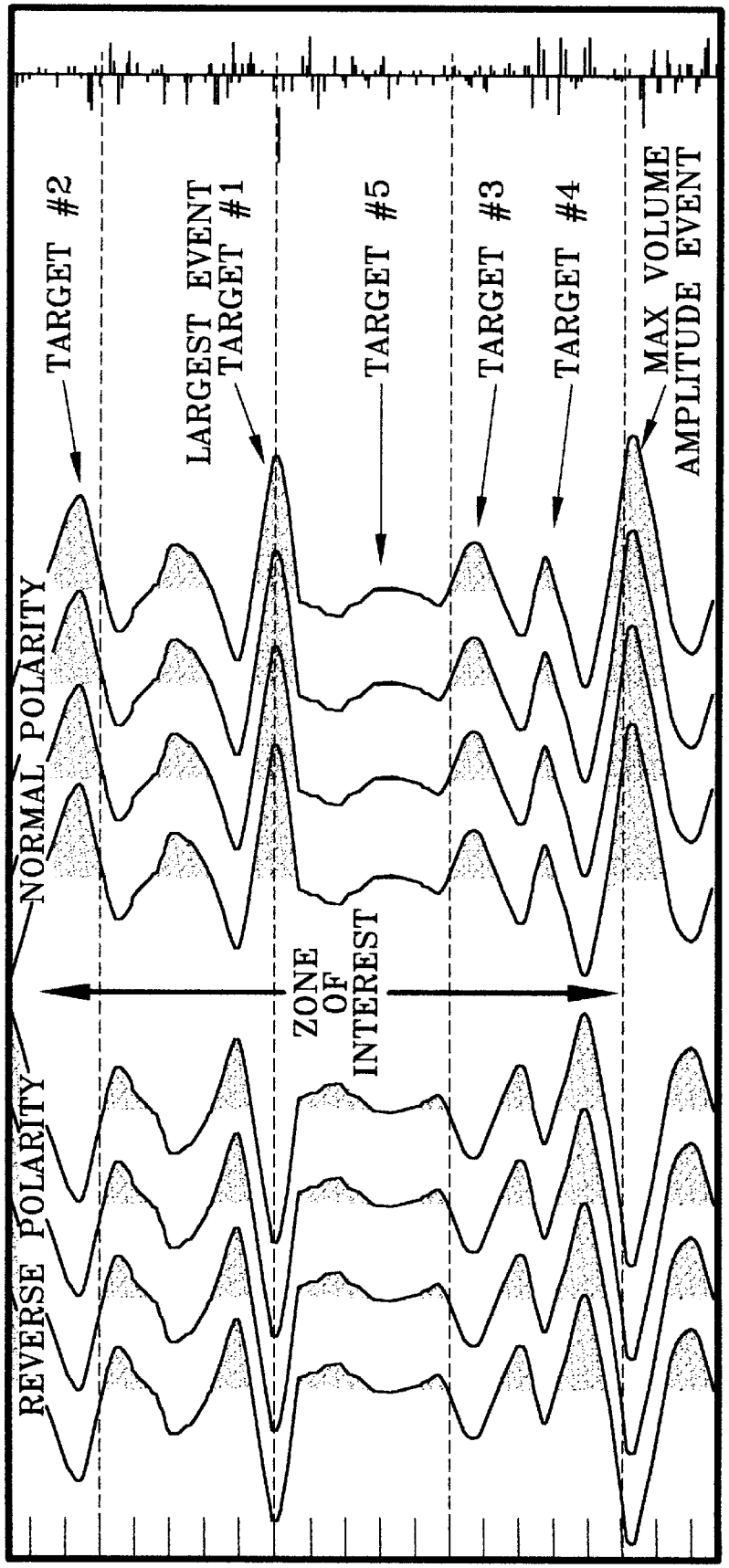
FIG. 8 is an illustration of a 1-D synthetic model where the waveform, indicating the presence of geologic zones of interest, has significant changes in dynamic range relative to the largest amplitude in the within the trace.

FIG. 8 is an illustration of a 1-D synthetic model where the waveform, indicating the presence of geologic zones of interest, has significant changes in dynamic range relative to the largest amplitude within the trace. If the changes in small or subtle amplitudes are to be detected, such as targets #4 and #5, then the 32-bit amplitudes values must be scaled up, which results in emphasizing the relevant subtle amplitudes, while clipping the maximum peaks and troughs occurring to the other large amplitude events, when conversion is applied, such as target #1.

Therefore, to achieve maximum color resolution for the detection of geologic events represented by subtle amplitude changes within wavelets, multiple versions of a 3-D seismic volume might be required. Multiple versions allows for the extraction of the most information from the proper visualization of multiple grade amplitude objectives. If needed, each volume would be uniquely scaled to maximize the dynamic range of subtle amplitude events associated with the characterization of a predetermined geologic target event, evident from modeling.

Seismic Amplitude Clipping

Within the exploration industry, decisions are generally made to scale floating point seismic data to 8-Bits while preventing any amplitude clipping within the 3-D seismic volume. Although it's true that clipping will result in a loss of dynamic range for large amplitude seismic events, the converse is also true for subtle peaks and troughs, which do not contain enough amplitude range for 8-bit binning, when converting from 32-bit floating-point values relative to the volume maximum amplitudes. Therefore, when using visualization applications, the dynamic range needed to delineate subtle changes in seismic waveform along geologic horizons of interest, might be inadvertently sacrificed due to the improper amplitude binning.

Conversion of data to 8-bits is required for current Voxel technology, and when seismic data is being prepared for visualization applications, it should be scaled to 8-bits with the objective of not clipping the floating-point magnitudes associated with identifiable geologic events of interest. If the data to be visualized were inappropriately scaled, significant dynamic range losses might occur along seismic horizons where subtle magnitude changes could reveal important geologic features. To determine the appropriate scale factors needed. The present invention provides a technique which determines the scalars and color signatures for seismic events of interest, and optimizes the dynamic range of the amplitudes representing those events. This technique is therefore designed to optimize scaling of the objective amplitudes, thus revealing the most subtle color changes possible in the waveform over selected time intervals of geologic interest.

Seismic and Model Data Amplitude Calibration

Data preparation for Calibrated Visualization is the key factor for controlling the amplitude distributions and the associated loss in color resolution for a particular target objective. The present invention provides a new technique which guides all steps of the data preparation and scaling process when preparing seismic or seismic attribute data for visual interpretation. The techniques of the present invention determines the scalars which should be applied to the data maximizing the dynamic range of target objectives. These scaling techniques could also be applied in normal seismic data loading operations required for standard interpretation packages.

The numerical results of a sample amplitude analysis are illustrated in Table 1. All values are calculated whenever the amplitude information is changed. Also, for interpretative reasons in making the sensitivity graphs more meaningful, it is necessary that the input amplitudes selected be sorted so the objective target amplitudes are in descending magnitude order.

In section B of Table 1, the user specified parameter % E, is the percentage of maximum amplitude to use for visualization of peak events. Section C shows the Max Amplitude After Objective Scaling while the data remains in 32-bit format. Section D shows the effective bin-width used when scaling. Sections E and F contain the calculated dB-loss and % dB-loss values obtained when linear amplitudes are converted to dB scale, relative to a known maximum amplitude.

TABLE 1A

Visualization Amplitude Calibration
Target Oriented Seismic Amplitude Scaling Analysis

| | Seismic Volume Amplitude Descriptions (A) | | | | Amplitude Location | | |
|---|---|---|---|---|---|---|---|
| Horizon Name | Scaler | Objective | Max Amp. | Bin Width | Line No | Bin No | Time |
| Volume (Max) | 0.00171 | Volume (Max) | 75,000.000 | 585.9375 | 0 | 0 | 0 |
| Zone #1 (Hot) | 0.00298 | Zone #1 (Hot) | 43,000.000 | 335.9375 | 0 | 0 | 0 |
| Zone #2 | 0.00753 | Zone #2 | 17,000.000 | 132.8125 | 0 | 0 | 0 |
| Zone #3 | 0.02133 | Zone #3 | 6,000.000 | 46.8750 | 0 | 0 | 0 |
| Zone #4 | 0.12800 | Zone #4 | 1,000.000 | 7.8125 | 0 | 0 | 0 |
| Zone #5 (Dim) | 0.25600 | Zone #5 (Dim) | 500.000 | 3.9063 | 0 | 0 | 0 |

TABLE 1B

Percentage of Max Amplitude Useable for Visualization
% E (user specified)

| | Objective Amplitude | | | | | | |
|---|---|---|---|---|---|---|---|
| Target Objective | Volume (Max) | Zone #1 + 10% | Zone #1 (Hot) | Zone #2 | Zone #3 | Zone #4 | Zone #5 (Dim) |
| Peak Percentage | 50% | 50% | 50% | 40% | 30% | 20% | 20% |

TABLE 1C

Max Amplitude After Objective Scaling (32 Bit Values are Clipped @ Amp = 128 in 8 Bits)

| | | Objective Amplitude | | | | | | |
|---|---|---|---|---|---|---|---|---|
| Target | Scalar | Volume (Max) | Zone #1 | 10% | Zone #1 (Hot) | Zone #2 | Zone #3 | Zone #4 | Zone #5 (Dim) |
| Volume (Max) | 0.0017 | 128.0 | 80.7 | | 73.4 | 29.0 | 10.2 | 1.7 | 0.9 |
| Zone #1 + 10% | 0.0027 | 203.0 | 128.0 | | 116.4 | 46.0 | 16.2 | 2.7 | 1.4 |

TABLE 1C-continued

Max Amplitude After Objective Scaling (32 Bit Values are Clipped @ Amp = 128 in 8 Bits)

| Target | Scalar | Volume (Max) | Zone #1 | 10% | Zone #1 (Hot) | Zone #2 | Zone #3 | Zone #4 | Zone #5 (Dim) |
|---|---|---|---|---|---|---|---|---|---|
| | | | | Objective Amplitude | | | | | |
| Zone #1 (Hot) | 0.0030 | 223.3 | 140.8 | | 128.0 | 50.6 | 17.9 | 3.0 | 1.5 |
| Zone #2 | 0.0075 | 564.7 | 356.1 | | 323.8 | 128.0 | 45.2 | 7.5 | 3.8 |
| Zone #3 | 0.0213 | 1600.0 | 1009.1 | | 917.3 | 362.7 | 128.0 | 21.3 | 10.7 |
| Zone #4 | 0.1280 | 9600.0 | 6054.4 | | 5504.0 | 2176.0 | 768.0 | 128.0 | 64.0 |
| Zone #5 (Dim) | 0.2560 | 19200.0 | 12108.8 | | 11008.0 | 4352.0 | 1536.0 | 256.0 | 128.0 |

TABLE 1D

Bin-Width Relative to Desired Scale Factor (32-Bit Amplitude Units)

| Target | Scalar | Volume (Max) | Zone #1 | 10% | Zone #1 (Hot) | Zone #2 | Zone #3 | Zone #4 | Zone #5 (Dim) |
|---|---|---|---|---|---|---|---|---|---|
| | | | | Objective Amplitude | | | | | |
| Volume (Max) | 0.0017 | 0.0017 | 0.0011 | | 0.0010 | 0.0004 | 0.0001 | 0.0000 | 0.0000 |
| Zone #1 + 10% | 0.0027 | 0.0043 | 0.0027 | | 0.0025 | 0.0010 | 0.0003 | 0.0001 | 0.0000 |
| Zone #1 (Hot) | 0.0030 | 0.0052 | 0.0033 | | 0.0030 | 0.0012 | 0.0004 | 0.0001 | 0.0000 |
| Zone #2 | 0.0075 | 0.0332 | 0.0209 | | 0.0190 | 0.0075 | 0.0027 | 0.0004 | 0.0002 |
| Zone #3 | 0.0213 | 0.2667 | 0.1682 | | 0.1529 | 0.0604 | 0.0213 | 0.0036 | 0.0018 |
| Zone #4 | 0.1280 | 9.6000 | 6.0544 | | 5.5040 | 2.1760 | 0.7680 | 0.1280 | 0.0640 |
| Zone #5 (Dim) | 0.2560 | 38.4000 | 24.2176 | | 22.0160 | 8.7040 | 3.0720 | 0.5120 | 0.2560 |

TABLE 1E

Absolute Loss in 8-Bit Dynamic Range (dB)
Relative to the Optimized Target Objective Amplitude and Scale Factor

| Target | Scalar | Volume (Max) | Zone #1 | 10% | Zone #1 (Hot) | Zone #2 | Zone #3 | Zone #4 | Zone #5 (Dim) |
|---|---|---|---|---|---|---|---|---|---|
| | | | | Objective Amplitude | | | | | |
| Volume (Max) | 0.0017 | 0 | 4 | | 5 | 13 | 22 | 38 | 44 |
| Zone #1 + 10% | 0.0027 | 4 | 0 | | 1 | 9 | 18 | 33 | 40 |
| Zone #1 (Hot) | 0.0030 | 5 | 1 | | 0 | 8 | 17 | 33 | 39 |
| Zone #2 | 0.0075 | 13 | 9 | | 8 | 0 | 9 | 25 | 31 |
| Zone #3 | 0.0213 | 22 | 18 | | 17 | 9 | 0 | 16 | 22 |
| Zone #4 | 0.1280 | 38 | 33 | | 33 | 25 | 16 | 0 | 6 |
| Zone #5 (Dim) | 0.2560 | 44 | 40 | | 39 | 31 | 22 | 6 | 0 |

TABLE 1F

Percent Loss in Objective Dynamic Range
Relative to the Optimum Target Scaling using an 8-Bit 2 dB Range

| Target | Scalar | Volume (Max) | Zone #1 | 10% | Zone #1 (Hot) | Zone #2 | Zone #3 | Zone #4 | Zone #5 (Dim) |
|---|---|---|---|---|---|---|---|---|---|
| | | | | Objective Amplitude | | | | | |
| Volume (Max) | 0.0017 | 0% | 10% | | 11% | 31% | 52% | 89% | 103% |
| Zone #1 + 10% | 0.0027 | 10% | 0% | | 2% | 21% | 43% | 79% | 94% |
| Zone #1 (Hot) | 0.0030 | 11% | 2% | | 0% | 19% | 41% | 78% | 92% |
| Zone #2 | 0.0075 | 31% | 21% | | 19% | 0% | 21% | 58% | 73% |
| Zone #3 | 0.0213 | 52% | 43% | | 41% | 21% | 0% | 37% | 51% |
| Zone #4 | 0.1280 | 89% | 79% | | 78% | 58% | 37% | 0% | 14% |
| Zone #5 (Dim) | 0.2560 | 103% | 94% | | 92% | 73% | 51% | 14% | 0% |

TABLE 1G

Max 8-Bit Color Value used to Represent Objective Target Amplitude

| | | | | Objective Amplitude | | | | | |
|---|---|---|---|---|---|---|---|---|---|
| Target | Scalar | Volume (Max) | Zone #1 | 10% | Zone #1 (Hot) | Zone #2 | Zone #3 | Zone #4 | Zone #5 (Dim) |
| Volume (Max) | 0.0017 | 128 | 127 | | 127 | 125 | 117 | 54 | −21 |
| Zone #1 + 10% | 0.0027 | 127 | 128 | | 128 | 126 | 121 | 82 | 34 |
| Zone #1 (Hot) | 0.0030 | 127 | 128 | | 128 | 126 | 122 | 86 | 43 |
| Zone #2 | 0.0015 | 125 | 126 | | 126 | 128 | 126 | 112 | 95 |
| Zone #3 | 0.0213 | 117 | 121 | | 122 | 126 | 128 | 123 | 117 |
| Zone #4 | 0.1280 | 54 | 82 | | 86 | 112 | 123 | 128 | 127 |
| Zone #5 (Dim) | 0.2560 | −21 | 34 | | 43 | 95 | 117 | 127 | 128 |

TABLE 1H

Relevant 8-Bit colors to Visualize Peak Amplitude Based on User Specified Percentage

| | | | | Objective Amplitude | | | | | |
|---|---|---|---|---|---|---|---|---|---|
| Target | Scalar | Volume (Max) | Zone #1 | 10% | Zone #1 (Hot) | Zone #2 | Zone #3 | Zone #4 | Zone #5 (Dim) |
| Volume (Max) | 0.0017 | 64 | 64 | | 64 | 50 | 35 | 11 | −4 |
| Zone #1 + 10% | 0.0027 | 64 | 64 | | 64 | 50 | 36 | 16 | 7 |
| Zone #1 (Hot) | 0.0030 | 64 | 64 | | 64 | 51 | 37 | 17 | 9 |
| Zone #2 | 0.0075 | 62 | 63 | | 63 | 51 | 38 | 22 | 19 |
| Zone #3 | 0.0213 | 58 | 61 | | 61 | 50 | 38 | 25 | 23 |
| Zone #4 | 0.1280 | 27 | 41 | | 43 | 45 | 37 | 26 | 25 |
| Zone #5 (Dim) | 0.2560 | −11 | 17 | | 22 | 38 | 35 | 25 | 26 |

TABLE 1I

Starting 8-Bit Amplitude Color Values for Visualizing Objective

| | | | | Objective Amplitude | | | | | |
|---|---|---|---|---|---|---|---|---|---|
| Target | Scalar | Volume (Max) | Zone #1 | 10% | Zone #1 (Hot) | Zone #2 | Zone #3 | Zone #4 | Zone #5 (Dim) |
| Volume (Max) | 0.0017 | 65 | 65 | | 65 | 76 | 83 | 44 | −16 |
| Zone #1 + 10% | 0.0027 | 65 | 65 | | 65 | 77 | 86 | 66 | 29 |
| Zone #1 (Hot) | 0.0030 | 65 | 65 | | 65 | 77 | 86 | 70 | 35 |
| Zone #2 | 0.0075 | 63 | 64 | | 64 | 78 | 89 | 91 | 77 |
| Zone #3 | 0.0213 | 59 | 62 | | 62 | 77 | 91 | 99 | 95 |
| Zone #4 | 0.1280 | 28 | 42 | | 44 | 68 | 87 | 103 | 103 |
| Zone #5 (Dim) | 0.2560 | −9 | 18 | | 23 | 58 | 83 | 103 | 103 |

All numbers in Table 1 are real and positive, since only the peak (or trough) magnitudes are relevant, and not the sign. The sign is needed for preserving the polarity after dB conversions. The numbers contained in the various tables are explained using the formula and graphs which are illustrated in FIGS. 9 through 14, with the formulas given in equations E1 through E7

Mathematical Discussion

The formula used to derive this calibrated scaling technique are relatively simple and straight forward, but are being applied in a unique manner. Using FIG. 8 as an example for amplitude calibration, the first step in the process is to identify all geologic objectives which can be correlated to seismic events. This is seen by the labels identifying target zones 1 through 5 and the volume maximum amplitude, in FIG. 8. Only these values need be recorded in section A of Table 1, using 32-bit numbers. Scalars and other values are calculated using the equations described herein.

The convention for the graphs in the following section will be as follows. The origin, in the lower left corner, will be the location of the data volume maximum amplitude event, with the scale factor that results in no clipping (i.e., amplitude=128) should the data be converted to 8-bits by standard truncation after scaling. The upper right hand corner of the graphs will represent the minimum objective amplitude location and the associated scale factor at which clipping occurs to amplitudes greater than the minimum amplitude target. Notice that a diagonal line from bottom left to upper right represents scaled amplitudes that are equal to the value of 128, (+or−) which is the largest value that can be represented in 8-bit notation (i.e., 128=$2^7$), using two polarities.

Figure 10:
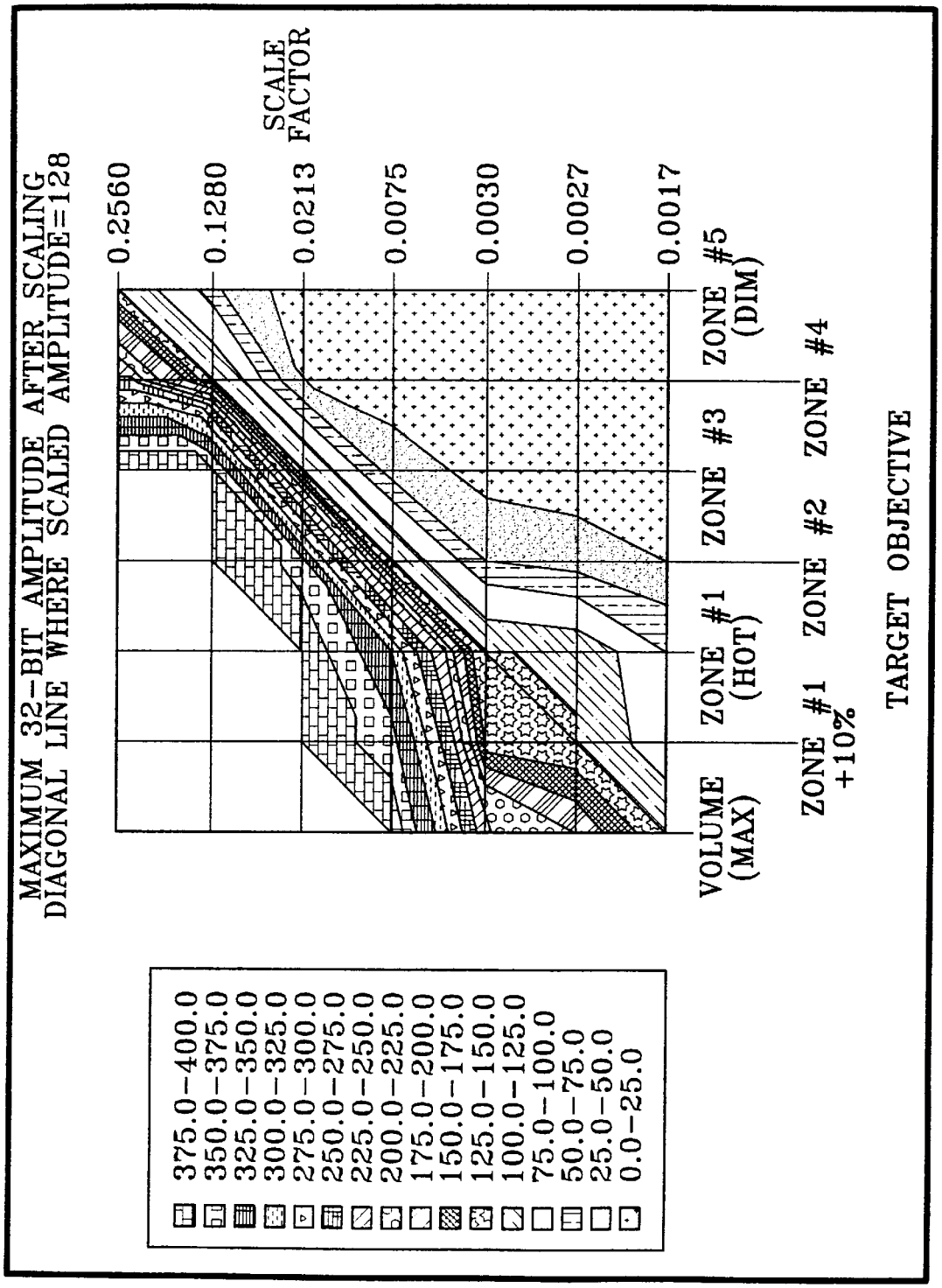
FIG. 10 is an illustration of the absolute value of the volume maximum amplitude times the objective scale factor.

The first step in the analysis is the calculation of the objective bin-widths and sale factors associated with each target event, required to scale the objective amplitudes to optimized 8-bit Voxel values. Bin-width is given in equation E1, and represents the absolute value of the objective target amplitude, (Amp(X)), divided by 128. The objective scale factor is defined in equation E2 as one divided by the bin-width. Equation E3 gives the maximum amplitude after scaling, while keeping the data in a 32-bit format. Thus, equation E3 is calculated as the absolute value of the volume maximum amplitude times the objective scale factor, equation E2. FIG. 10 also shows equation E3 graphically.

$$BW=ABS(Amp(X))/128 \qquad E1$$

$$SF(X)=1/BW \qquad E2$$

$$MA(X)=ABS(Amp(V))*SF \qquad E3$$

Figure 9:
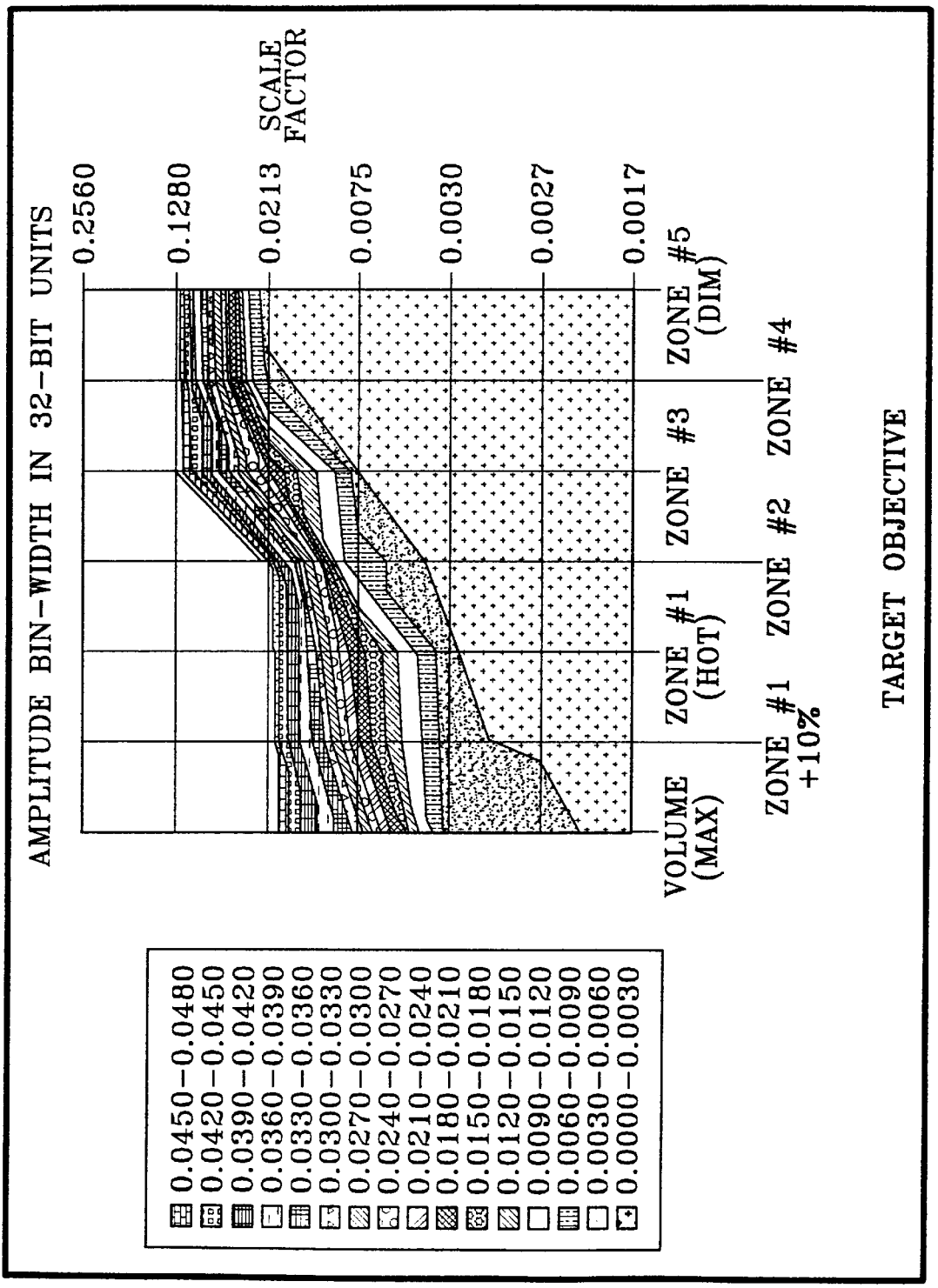
FIG. 9 is a graphical representation depicting the sensitivity of bin-width changes, relative to objective scale factors.

In equation E3, MA(X) is the maximum amplitude after objective scaling, and Amp(V) is the volume maximum amplitude. FIG. 9 is a graphical representation depicting the sensitivity of bin-width changes, relative to objective scale factors applied to the data. FIG. 10 illustrates the range of amplitudes relative to a maximum 8-bit amplitude of 128. The contours in FIG. 10, at this point, still represent the 32-bit amplitudes after applying the objective scalars. Again, values to the left of the diagonal line get clipped in 8-bits, and values right of the diagonal are not optimally binned for maximum dynamic range. FIG. 10 helps to illustrates the extent of amplitudes that would be clipped, or under-binned, when converted to 8-bits using a standard bit truncation after scaling method. From FIG. 10, it is clearly shown that a relative loss in the voxelized dynamic range will occur for any amplitude event not close to the diagonal position.

For example, when a scale factor is applied, target (objective) amplitudes will be scaled to the number 128.0 which is a 32-bit real value. Notice in FIG. 10 that when the scale factor "0.0017" is used, there would be no clipping of the data, since no contours exist to the left of the diagonal at the volume maximum amplitude location. If Zone #3 were the target amplitude, then the scale factor would be "0.0213", such that the larger amplitudes, to the left, will be clipped in 8-bit format, but smaller amplitudes, to the right, are less coarsely binned to maintain the maximum dynamic range for the Zone #3 objective in linear 8-bit format.

Figure 11:
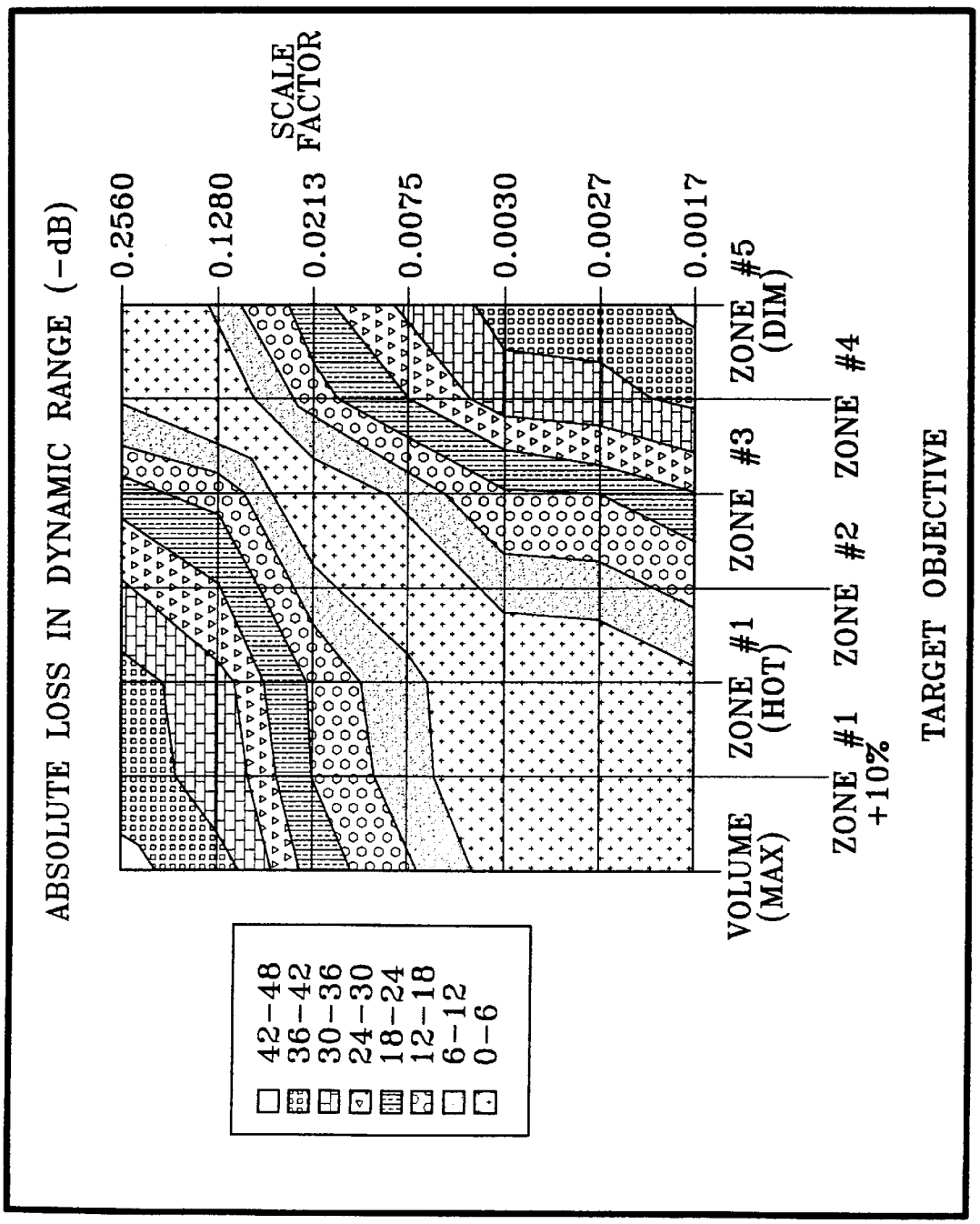
FIG. 11 is a sensitivity plot showing the absolute loss in dynamic range relative to the 8-bit optimized target objective amplitude and scale factor.

A sensitivity plot showing the absolute loss in dynamic range relative to the 8-bit optimized target objective amplitude, and scale factor, is illustrated in FIG. 11. Equation E4 is used to calculate the values for Absolute Loss in Dynamic Range (ADRDL), and where MA(V) is the maximum 8-bit amplitude to keep unclipped after scaling (i. e., MA(V)=128 or $2^7$) within the volume.

$$ADRDL(A)=ABS\{20 \log(MA(X))\}-ABS\{20 \log(MA(V))\} \qquad E4$$

$$PDRDL(A)=ADRDL(A)/MA(X) \qquad E5$$

Figure 12:
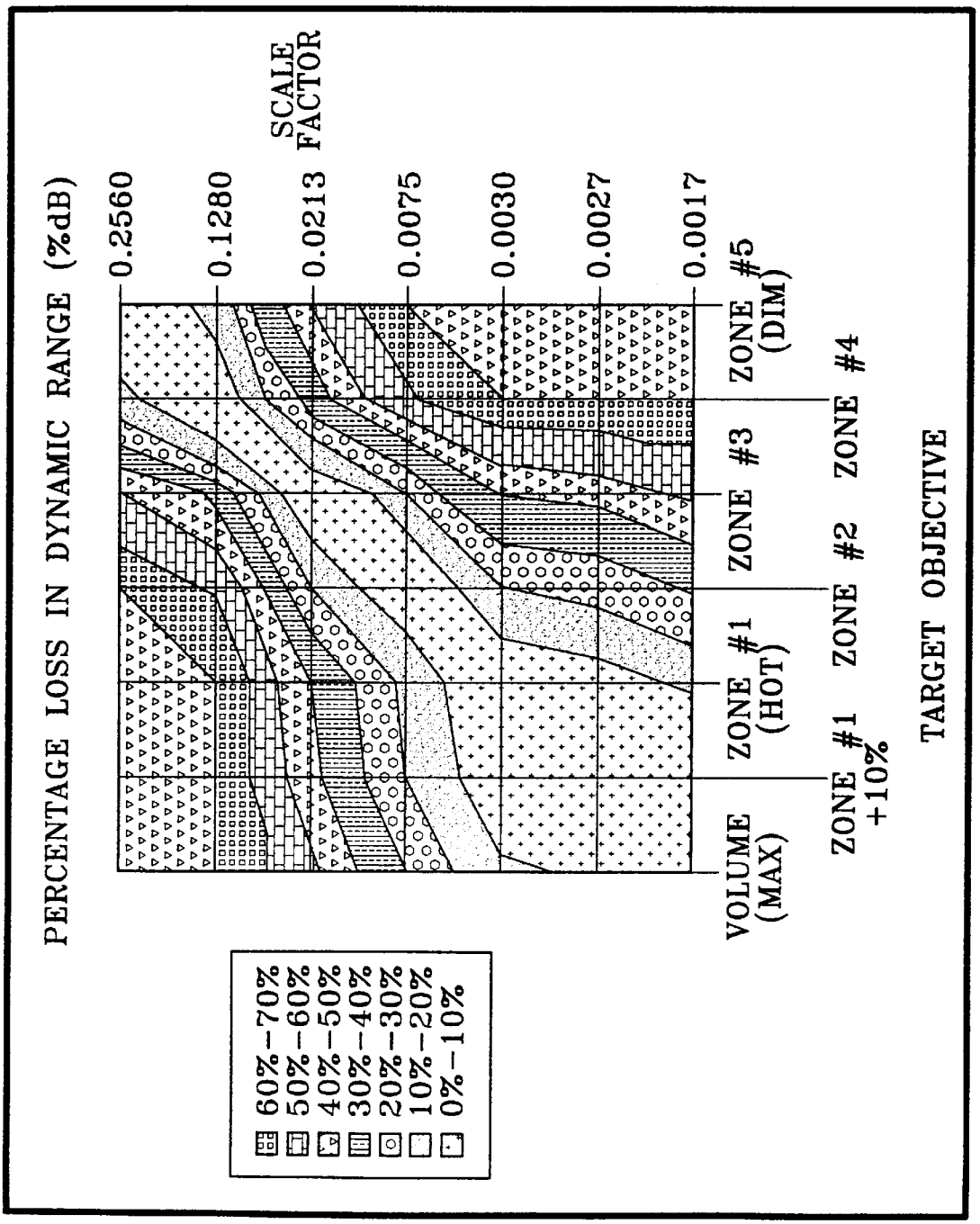
FIG. 12 is a sensitivity plot, plotted as a percentage loss in dynamic range, showing the absolute loss in dynamic range relative to the 8-bit optimized target objective amplitude and scale factor.

FIG. 12 represents the same concept as FIG. 11 except the sensitivity is plotted as a percentage loss in dynamic range (PDRDL), which is given in equation E5; or equal to ADRL divided by MA(X).

In the process of scaling a 3-D survey to 8 bits, an entire seismic data volume can be represented in dynamic range (dB) format relative to a selected maximum amplitude, in addition to the traditional processed linear amplitude scale. Within a seismic dB volume, all 32-bit values would generally fall between 0 and 96 dB, relative to the selected maximum volume amplitude. Thus, generally, no clipping is necessary to represent dB scaled data in 8-bits. Also, in this form, all the data becomes more easily visible, as there is an expansion of colors from FIGS. 10 to 11. This results from using a non-linear dB scale representation of the amplitudes, with a linear color scheme.

When a seismic volume is converted to dB scale, the sign (+or−) of the original data must be kept for each amplitude to indicate the data polarity. FIG. 12 is another way to represent seismic data using a % dB scale, where the amplitudes might be more easily separated within the color contours, as seen in the contrast between FIGS. 11 and 12. Additionally, signal processing may be applied to the data in dB scale, or % dB scale form, since frequency and phase assumptions are not violated using this technique.

From the comparison of FIGS. 10 through 12, it can be seen that 32-bit amplitude data converted to dB scale, should result in better color separation of the dimmer or more subtle amplitude changes, compared to linear scaled amplitudes, and more amplitude information can be represented without clipping, using dB data. Currently, visualization technology requires that the 32-bit data be truncated or converted to 8-bit format. However, 96 dB is easily represented in 8-bits, and this conversion should retain much more of the original amplitude information, than is possible when reformatting to linear 8-bit data, even with the data scaled to optimize a selected target objective.

It should also be noted that the amplitude scaling could use various other functions not necessarily related to dynamic range or log base 10 scaling, such as for example, log, polynomial, and exponential functions.

The equation for the maximum 8-bit linear value, (or color), is E6, where MAXC is the maximum color value for any objective, given any other objective scale factor, (assuming 128 colors are used in visualization). Normally, in this graphical representation of MAXC, the values to the left of the diagonal would appear to be mirroring the right side. However, values to the left of the central diagonal are clipped in converting to linear 8-bit amplitudes from dB scale, since only 48 dB can be converted to linear 8-bit amplitude.

$$MAXC(A)=128-(10^{-((ADRDL(A))/20)}) \qquad E6$$

$$MINC(A)=MAXC(A)-(\% \ E*MAXC(A))+1 \qquad E7$$

Figure 13:
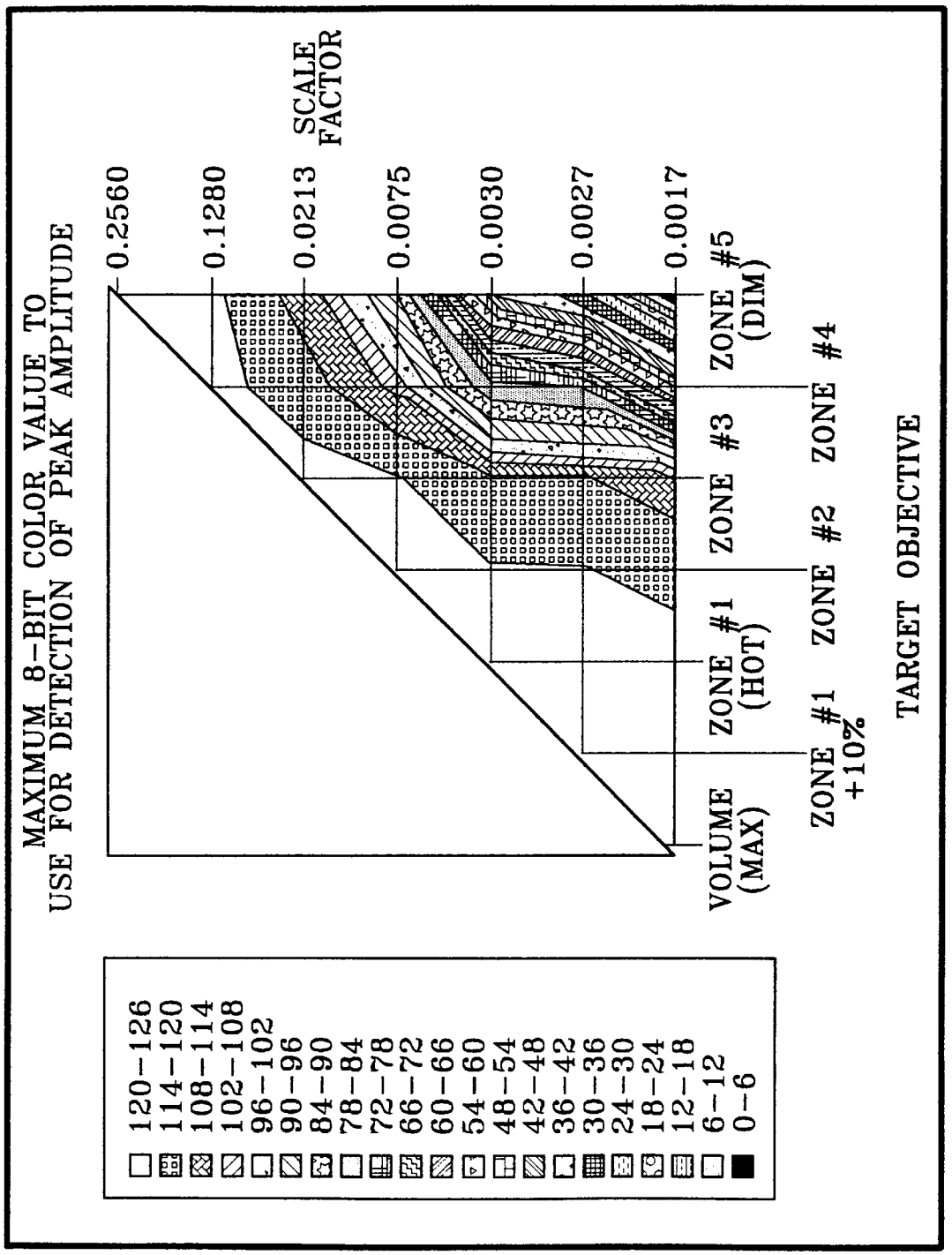
FIG. 13 illustrates the sensitivity of changes in the maximum 8-bit color value for the detection of objective peak amplitudes when using linear amplitudes with various scale factors.
Figure 14:
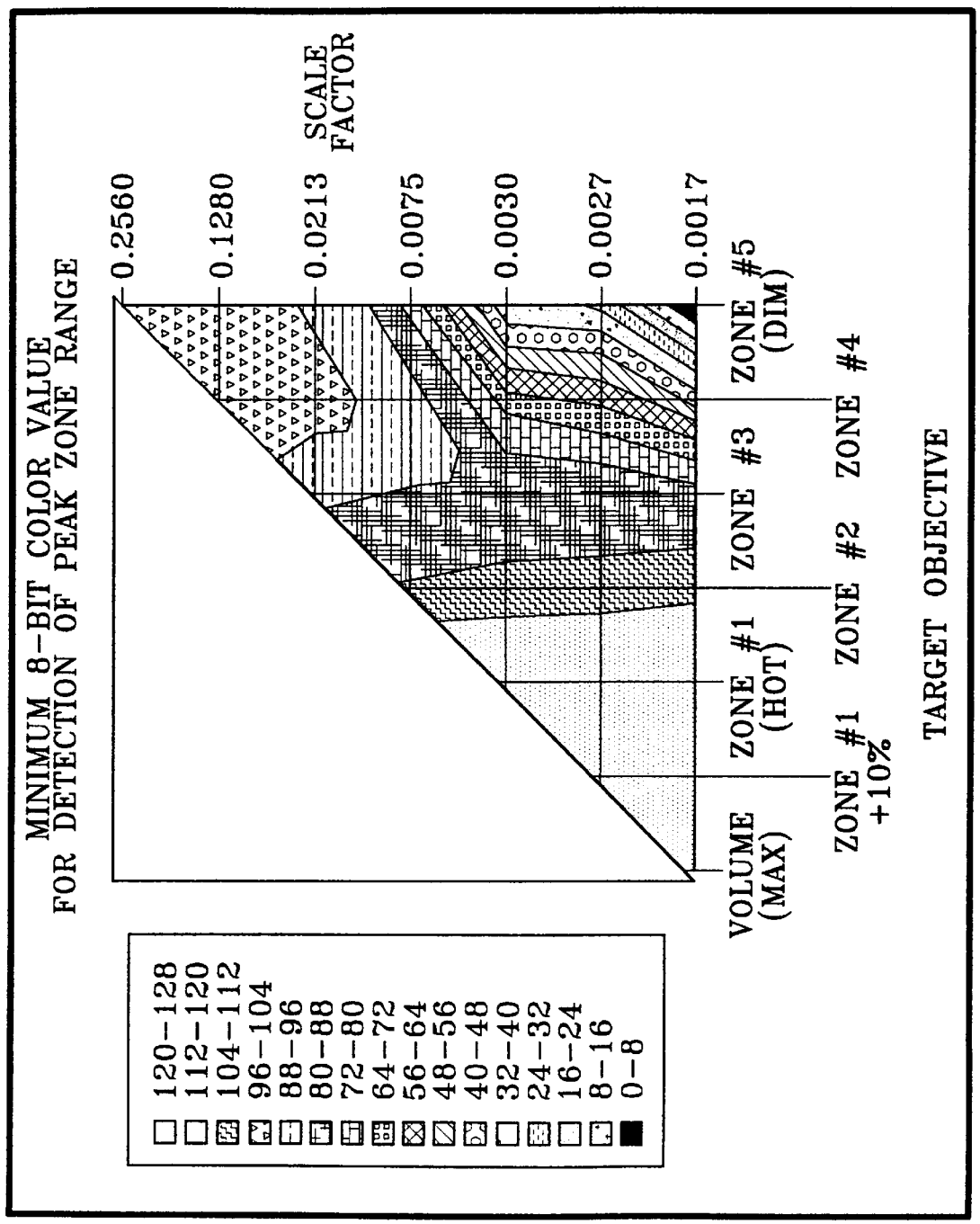
FIG. 14 is the minimum value to use for detection of a calibrated waveform.

FIGS. 13 and 14 together were designed to be used in conjunction with the interactive visual interpretation process. FIG. 13 illustrates the sensitivity of changes in the maximum 8-bit color value for the detection of objective peak amplitudes when using linear amplitudes with various scale factors. This is also the voxelized 8-bit amplitude value which is derived in equation E6 from the dynamic range, by taking the difference of the maximum 8-bit amplitude value (MX(V); equal to 128 for 8-bits), and the inverse log of the absolute loss in dynamic range (ADRDL), seen in FIG. 11.

FIG. 14 represents the minimum value to use for detection of a calibrated waveform. The value MINC is calculated in equation E7 as the difference in MAXC, and a user defined percentage (% E) of the event to use for visualization of subtle changes in the peak waveform; defined in Table 1(B). The minimum amplitude, FIG. 14, might be useful in avoiding unwanted events, and better delineating subtle changes in the seismic waveform.

From the comparison of FIGS. 11 and 13, this technique again shows that 32-bit amplitude data converted to dB scale and then back to linear amplitude, should result in better color separation of the subtle changes in the peak waveforms, compared to original linear amplitudes. This difference is also seen conceptually in FIGS. 10 and 13 as the tightness of the contours change when converting from dB scale back to a linear 8-bit scale amplitude data. The color contrast in FIG. 13 is much better for subtle changes in peaks than in FIG. 10, (the unconverted 32-bit linear amplitude). In FIG. 13, the linear 8-bit data was converted, with a maximum value of 128, after optimal target scaling.

Technology Application

Locations for amplitude calibration points should be performed at the well tie locations, where a good synthetic tie correlation can be made, and the analysis can be performed using good quality processed 3-D seismic data, and petrophysically corrected log data.

In actual practice, a major shortcoming in visualization has been the lack of calibration, where direct comparisons of various known amplitude events could not be made, via color signature identification. Typically, model and real data are not normalized to each other in amplitude, and real data might have many more events not present in the models. Therefore, direct color signature comparisons are difficult to make if "dB" calibration (or dynamic scaling) is not performed, or if the pre-processing of well and seismic is not correct. This process, referred to as "dynamic scaling," is also ideally suited for technologies such as coherency cubes, reflectivity, energy absorption, and other attribute volumes, since the amplitudes of the significant features are typically packed close together within a linear amplitude scale.

Figure 15:
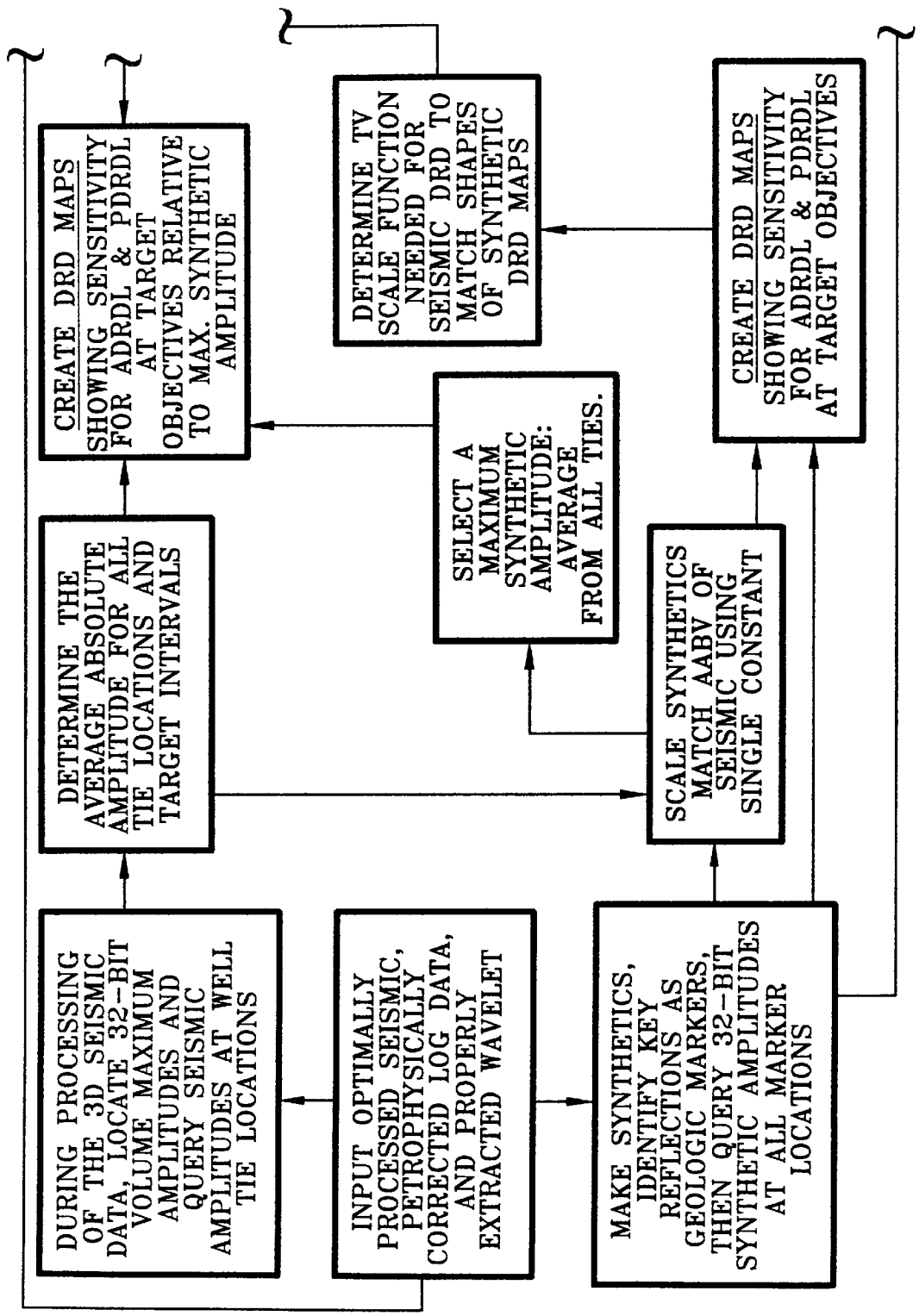
FIG. 15 illustrates using dynamic scaling for color calibration where a synthetic tie has been made between the seismic and well data where a good character fit and "dB" fit is achieved.
Figure 15A:
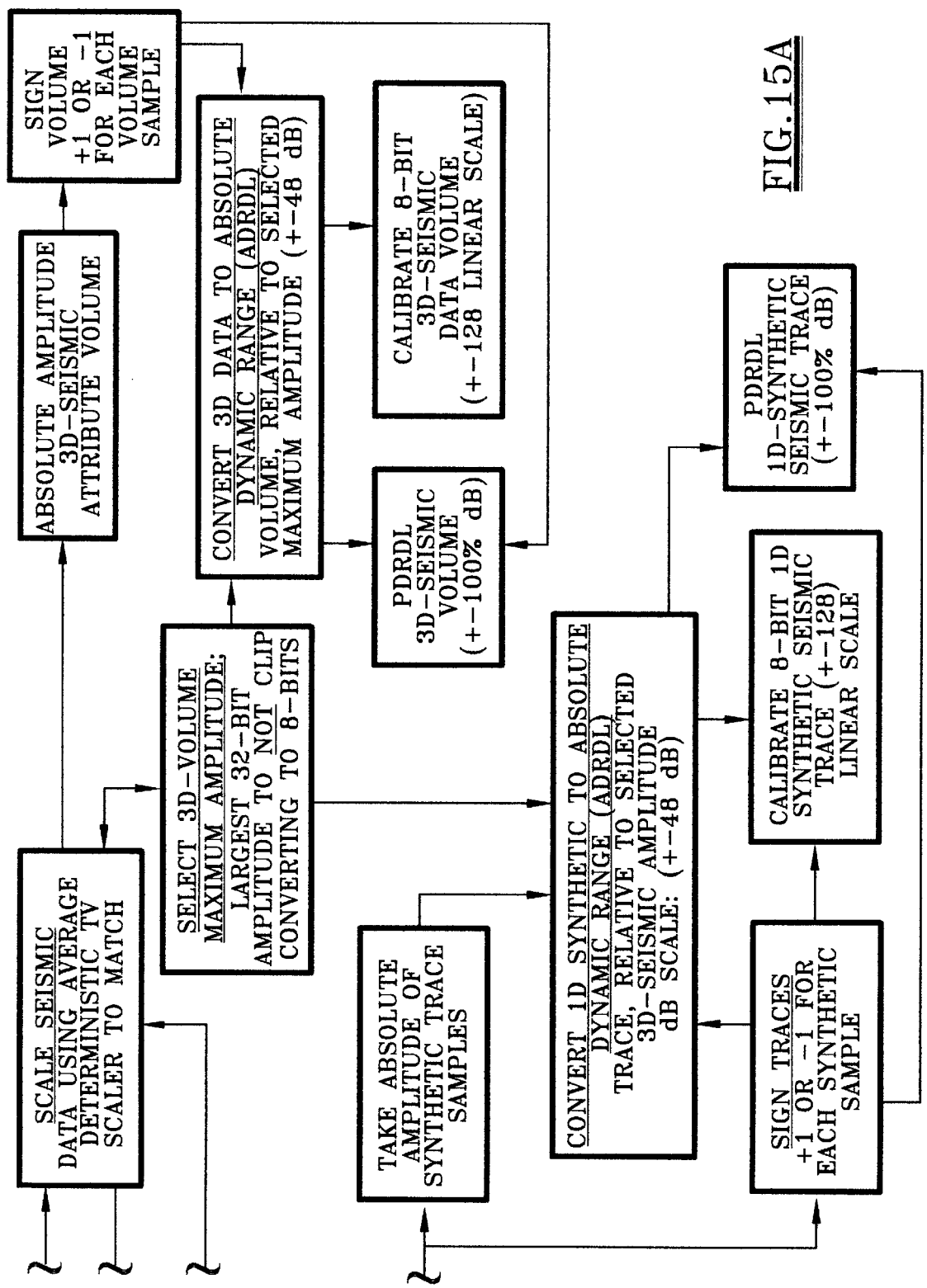
Figure 16:
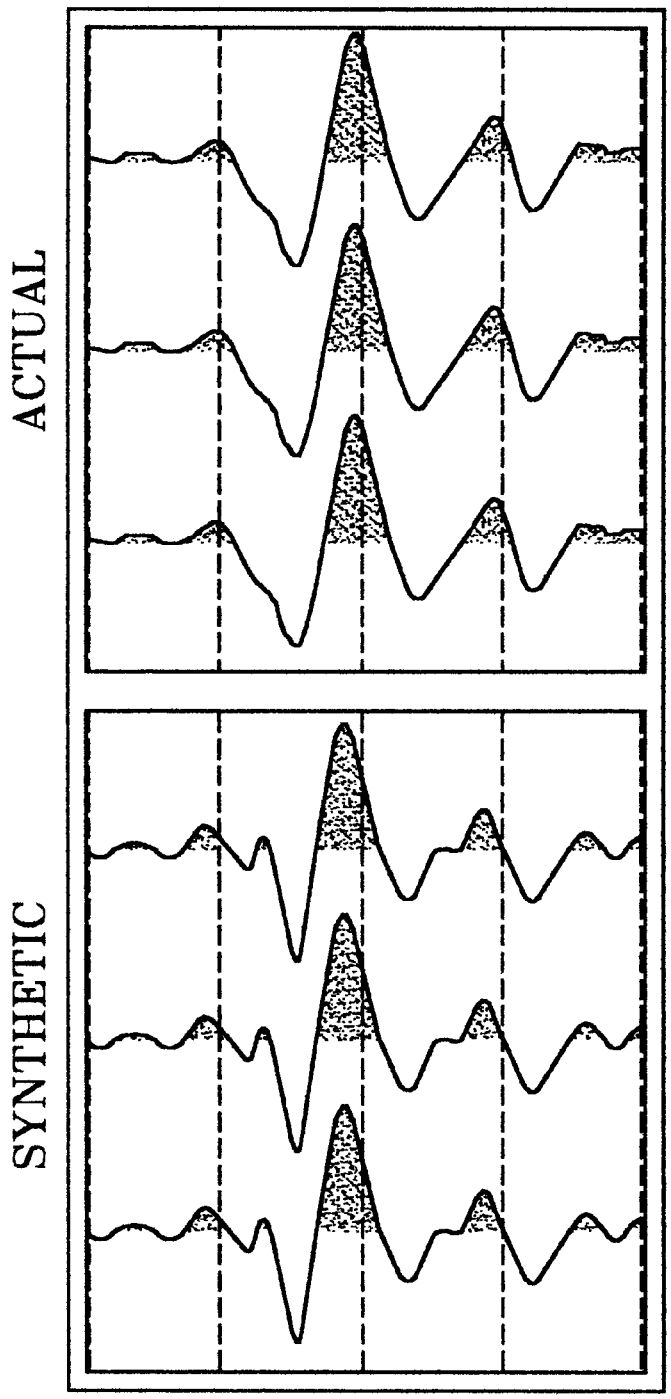
FIG. 16 is illustrates using dynamic scaling for color calibration where a synthetic tie has been made between the seismic and well data such that the calibrated colors allow easy differentiation of the known seismic responses in target zone 1 relative to zone 3.

An example using dynamic scaling for color calibration is shown in FIGS. 15 and 16, where a synthetic tie has been made between the seismic and well data. Using the flow in FIG. 15, a very good character fit and "dB" fit is achieved. Thus, the waveforms for both the seismic and model data in FIG. 16, will have calibrated colors which should allow one to easily differentiate known seismic response in target zone 1 relative to zone 3, once properly tied, scaled, and voxelized.

Amplitude Matching

To accomplish the matching of exact color signatures between model and acquired seismic data, a process flow chart, shown in FIG. 15, was developed as a technique by which one could accomplish color calibration for visual interpretation applications. Sensitivity plots, showing dB patterns, can be used to compare "dB" amplitude differences between model and real data. This might also be more accurate a method for analyzing amplitude ties between seismic and synthetic data, since amplitude ratios could be significantly different even though the character tie appears to be good using conventional interpretation and correlation methods.

If the amplitude ratios of the subtle and large magnitude events in the synthetic models are similar in dynamic range, then the shape of the ADRDL and PDRDL analysis graphs, FIGS. 11 and 12, respectively, should match closely between model and real data. The flow chart, FIG. 15, also contains two integrated/parallel processes, which are intended to illustrate how the calibration of real and synthetic data amplitudes is done simultaneously.

First, in FIG. 15, the assumptions are that the input data to this process consists of optimally processed seismic data, petrophysically corrected well log data, with properly extracted wavelets over the objective time intervals. Amplitude analysis are performed on the seismic volume, and synthetics are made identifying seismic responses generated by the physical properties of the modeled geologic framework. Then, average absolute value (AABV) of the amplitudes within the target interval are calculated from the seismic volume, and a single scalar is determined, which is applied to the synthetic data. This results in matching the AABV of the synthetics over the same time interval as the seismic data. This scalar could also be determined using other techniques such as RMS calculations, (root mean squared), energy over a specified bandwidth, average peak amplitude, or average trough amplitude.

Once the well tie has been made, a Peak (or trough) magnitude event is chosen on the synthetic as the objective maximum amplitude, for which the dB scaling process will be relative. FIG. 16 illustrates the peak magnitude event, (Zone 1), and also shows the large differences in absolute amplitude values that occur between synthetic and real data. At zone 1, the peak value is relatively large compared to 128 for the processed data while the synthetic peak magnitude is relatively small, However, the dB ranges, relative to the zones 1, 2, & 3 peak magnitude, are very similar between synthetic and seismic, and all amplitudes lie within 0 and 96 dB down, relative to the maximum peak value.

After the AABV's have been matched, a time variant scale function is derived, which matches the dynamic range characteristics of the 3-D seismic data to the dynamic range characteristics of the synthetics. Once the uniform TV scale function is applied to the seismic data volume, both the relative linear amplitudes and relative dynamic range signatures will be close in magnitude and character, compared to synthetic models with known rock and fluid properties. Therefore, both the model and real data can now be dynamically scaled in dB, relative to a single maximum amplitude chosen from the seismic data volume, such that the known dB color signatures from the DRD maps, (FIGS. 10, 11, 12 and 13), for key objective events in the calibration synthetics, match the color signatures in the seismic data.

Figure 1:
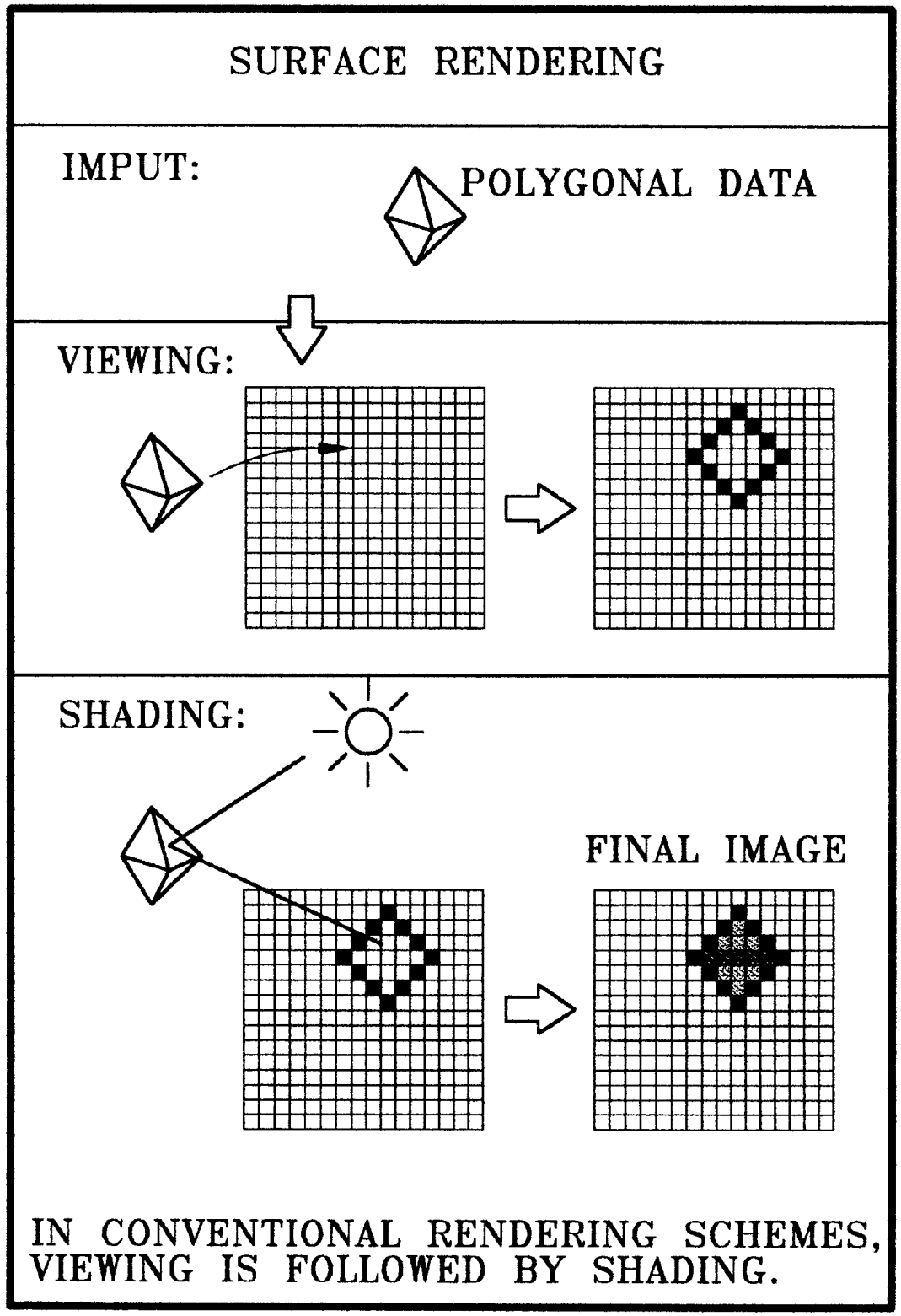
FIGS. 1 and 2 illustrate the conceptual differences between 3-D surface visualization and 3-D volume visualization.
Figure 2:
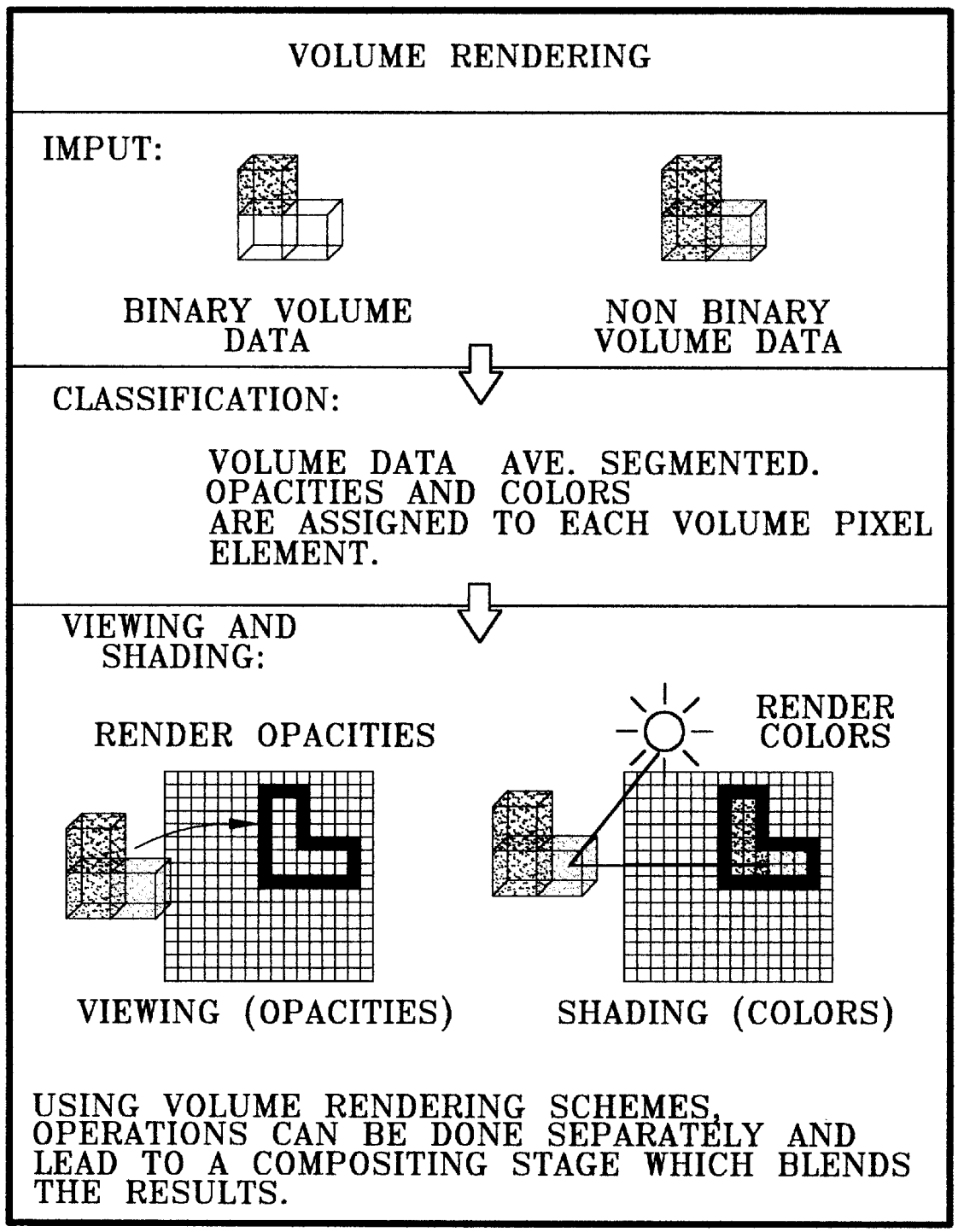
Figure 4:
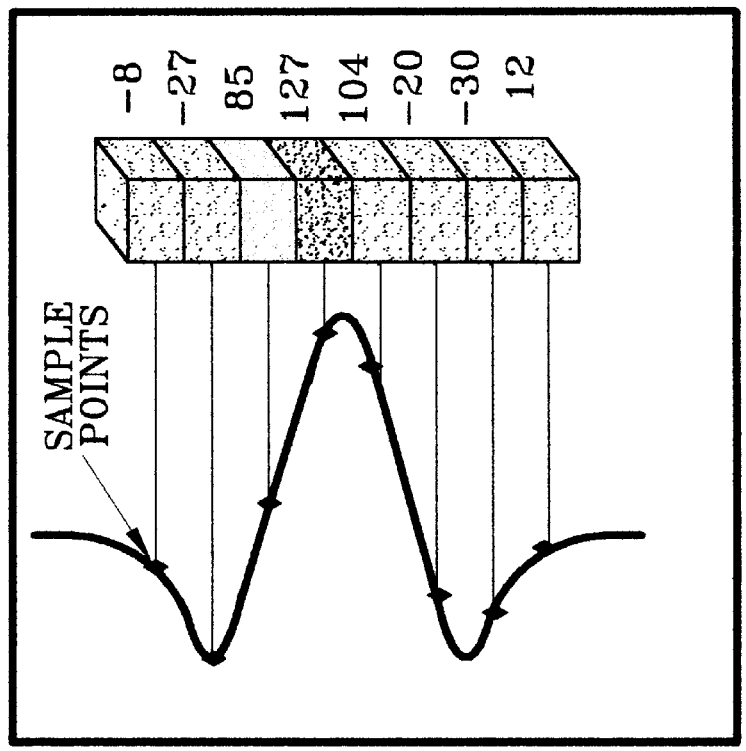
FIG. 4 is a voxelized representation of a seismic wavelet.
Figure 3:
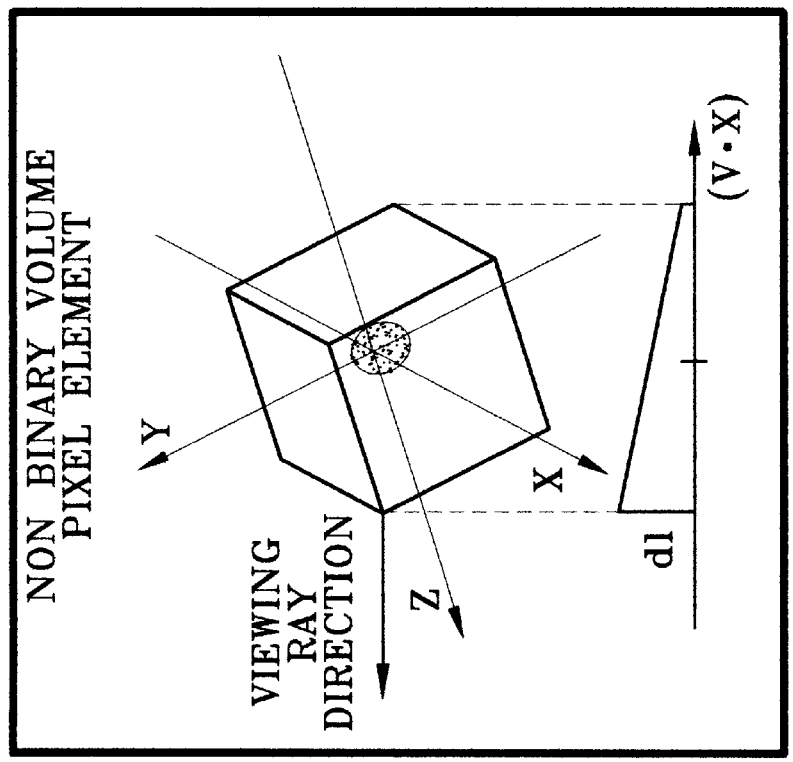
FIG. 3 illustrates the concept of a single Voxel.
Figure 5:
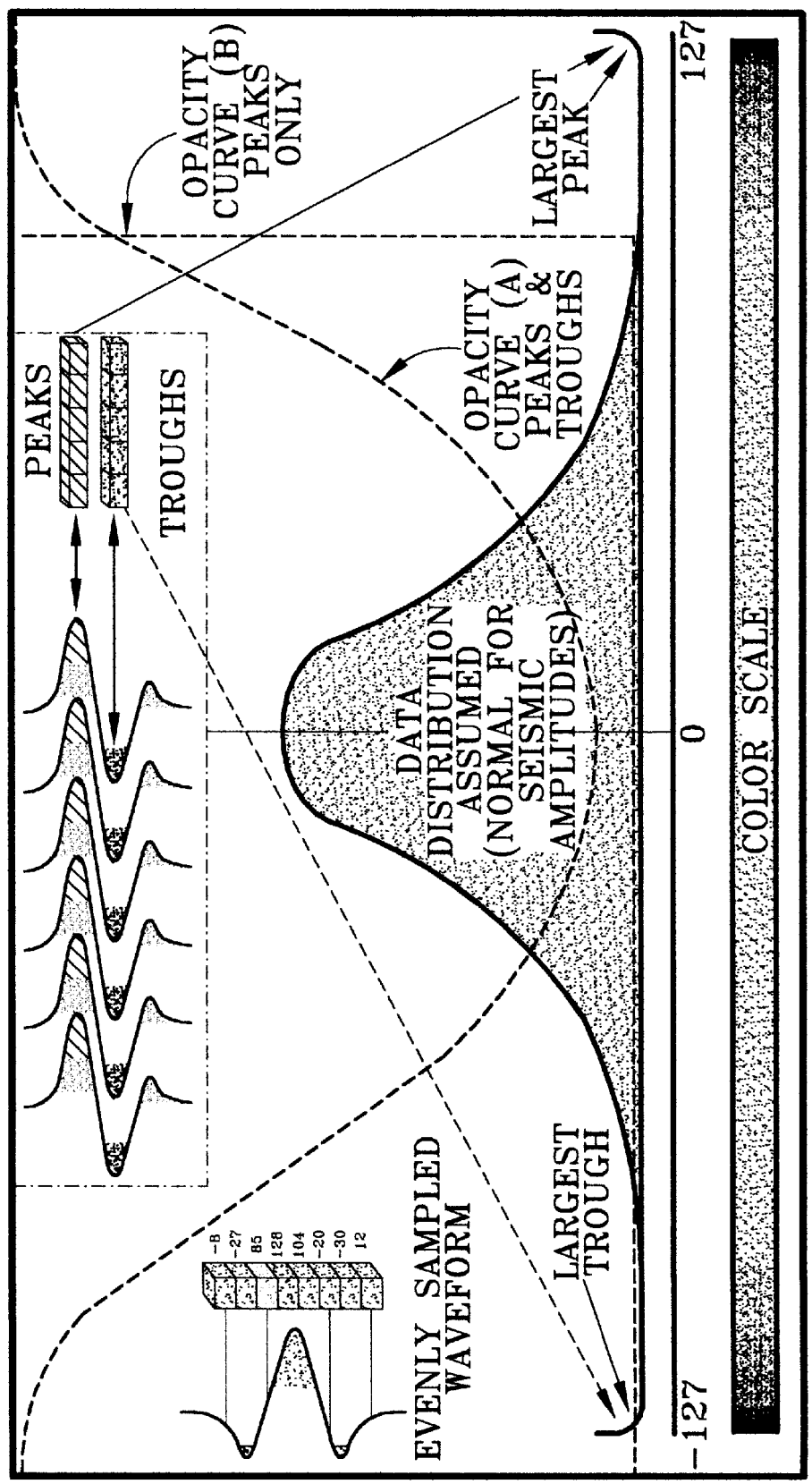
FIG. 5 is a statistical histogram illustrating the distribution of amplitude or attribute values within an entire 3-D volume.
Figure 6:
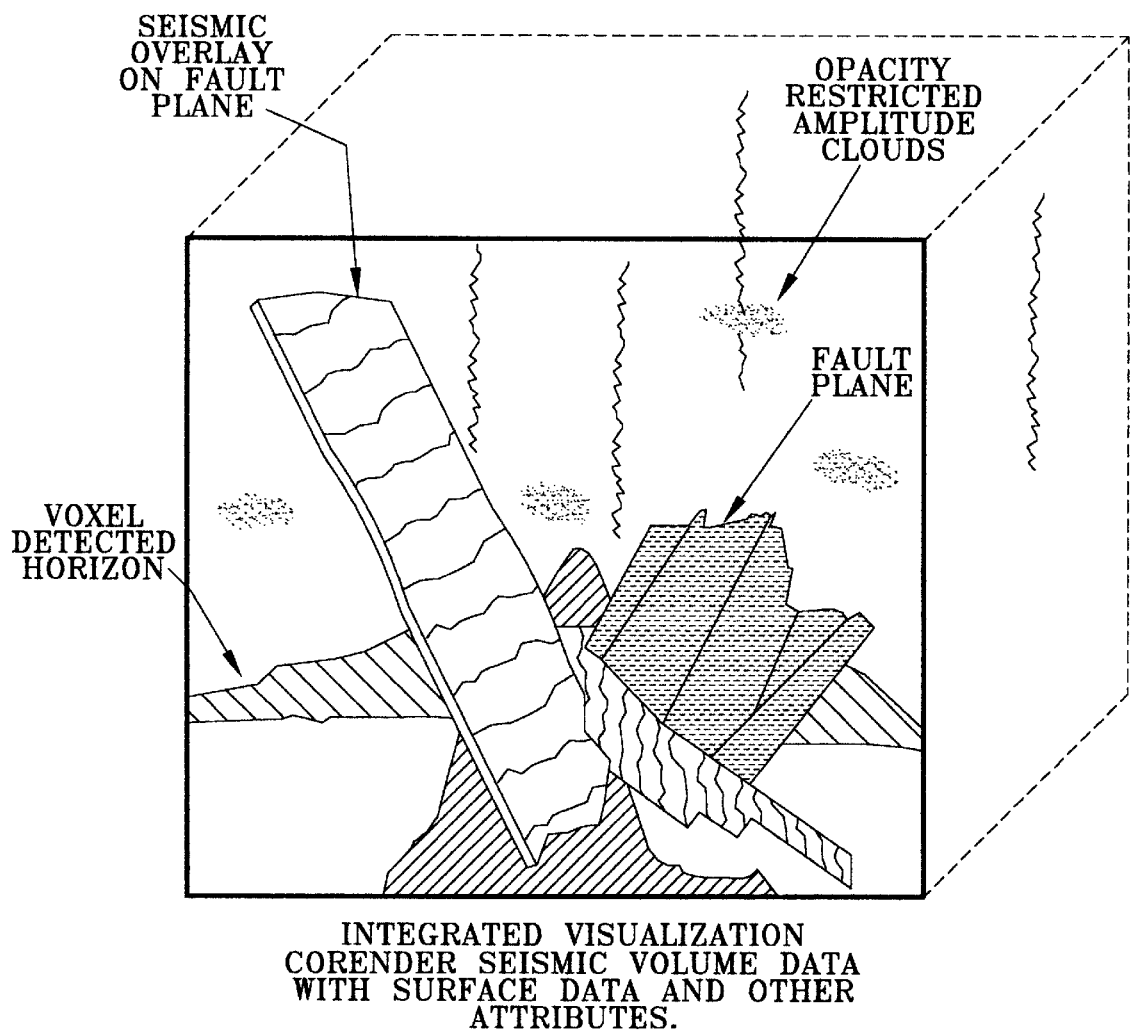
FIG. 6 illustrates the type of images that can be rendered using modern integrated visualization and interpretation technology.
Figure 7:
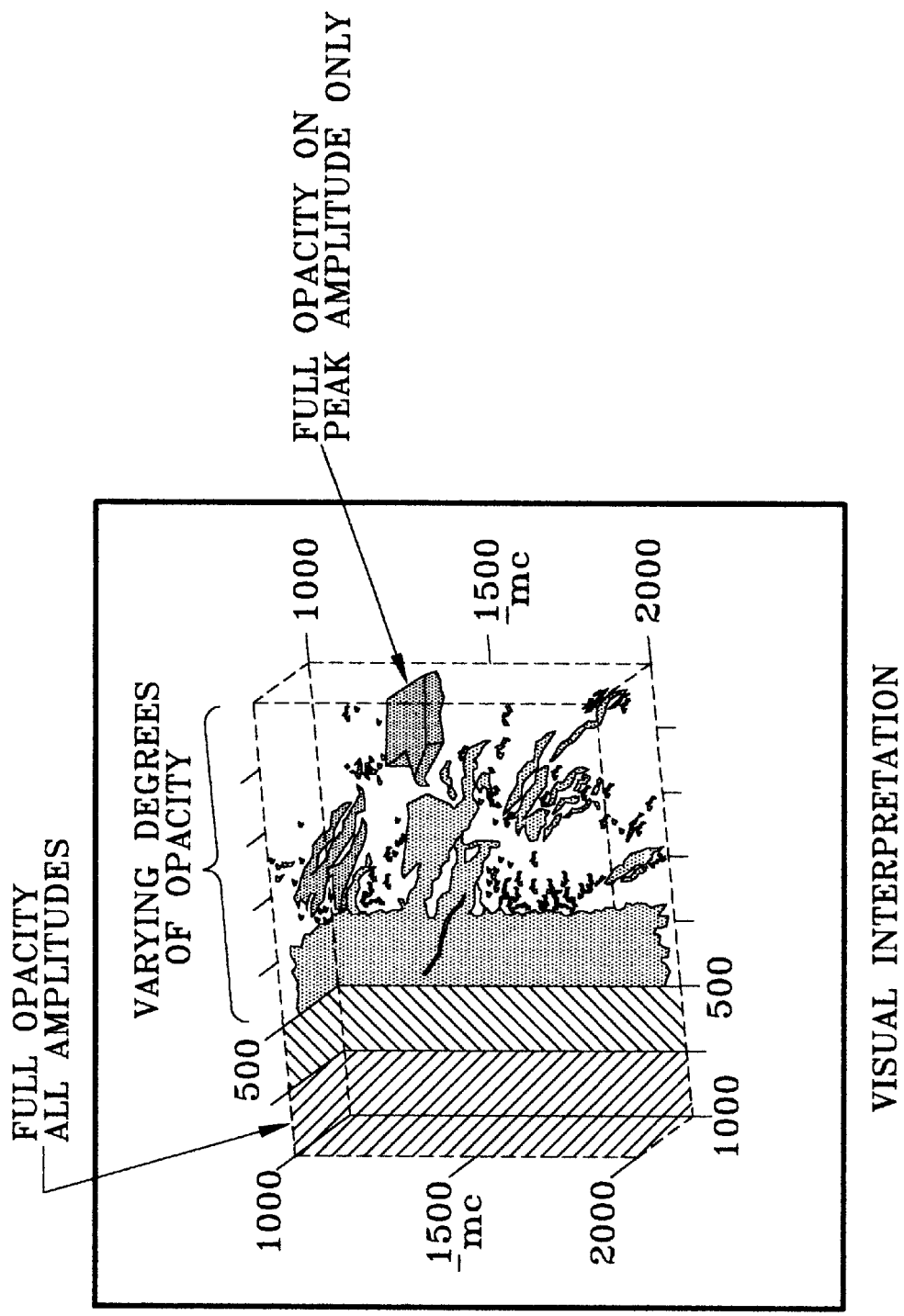
FIG. 7 illustrates another type of images that can be rendered using modern integrated visualization and interpretation technology similar to FIG. 6.
Figure 17:
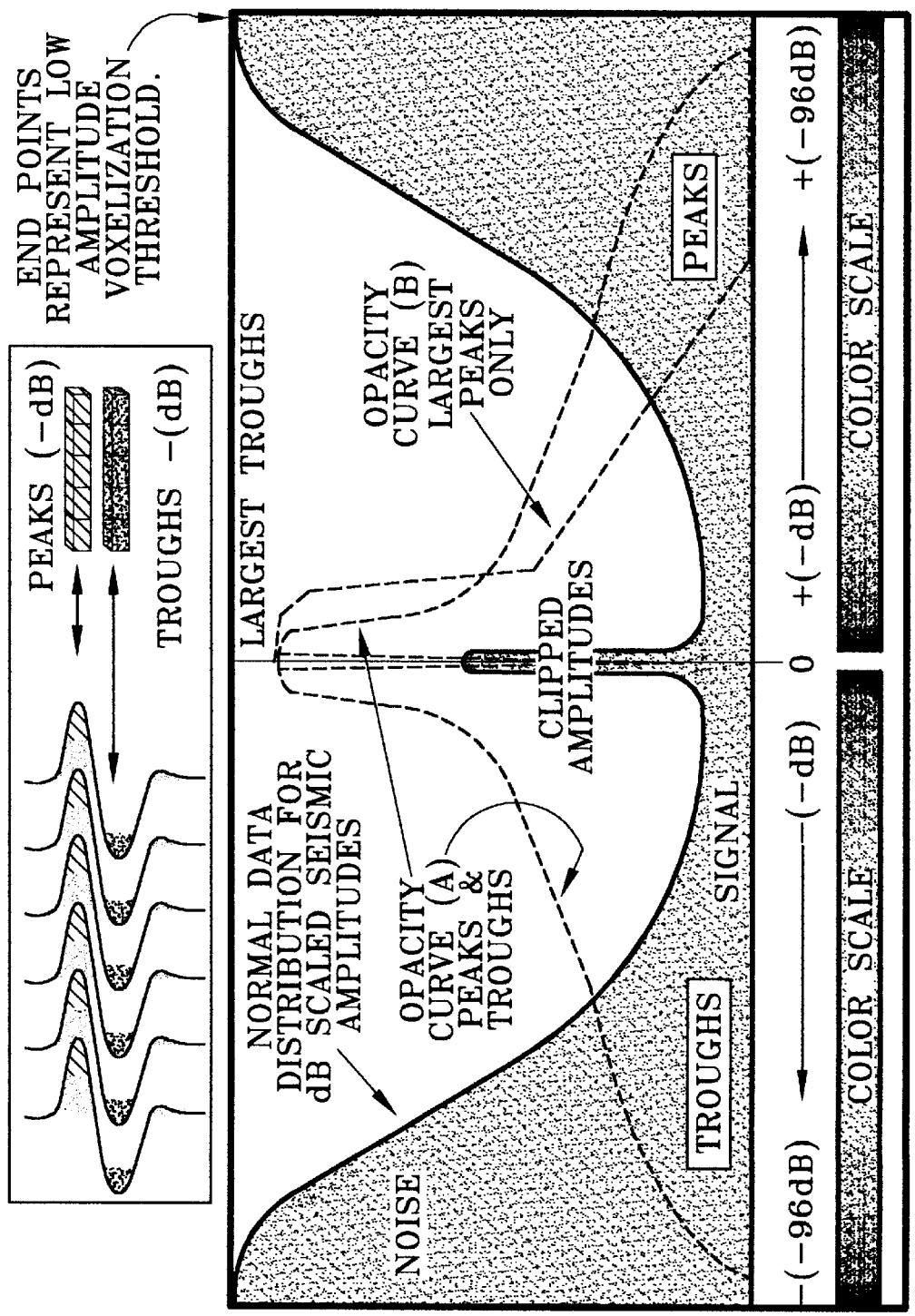
FIG. 17 is a statistical histogram illustrating the distribution of dB magnitudes within the 3-D volume.

Once a 3-D volume has been converted to dB scale, the statistical distribution of dB amplitude values have the general character illustrated in FIG. 17. FIG. 17 is a statistical histogram illustrating the distribution of dB magnitudes within the 3-D volume. This histogram is again an alternate representation of all the volume samples, as related to the absolute count of each dB sample when statistically binned. Note the shape of the statistical data distribution, FIG. 17, for a "Dynamically Scaled" dB magnitude seismic volume; (also showing the opacity curves for visualization of peak and trough events). Compared to FIG. 5, the distribution for linear scaled data, the dynamically scaled dB data distribution in FIG. 17 is split down the middle and flipped inside-out.

A significant feature of the data distribution of dynamically scaled data, FIG. 17, is that the large magnitude peaks and troughs are now close to the center (0), while the noise is pushed out to the tails of the distribution curve. All clipped valued will be located at 0 dB, since these values after scaling are a relative dB gain instead of only the losses represented along the X-axis; with the sign of the original seismic data volume designating the polarity of each dB sample.

Application Extensions

In addition to the typical seismic amplitude volumes, a number of other attribute and model volumes can be output and calibrated to help validate the results and integrate various technical disciplines in practicing the present invention. The various data sets that might be analyzed and dynamically scaled for visualization include the "a priori" impedance model, a synthetic seismic trace volume, a reflectivity volume, a residual amplitude volume, velocity models, porosity models or other stratigraphic models.

Before creating attribute volumes, target oriented data enhancement procedures are typically used to optimize the interpretability over the target zones, and reduce noise prior to voxelization or scaling for visualization. Amplitude analysis calculations then produce the information needed to properly scale the various attribute cubes relative to known amplitude relationships, (i.e., models). This is crucial when operating visualization software tools, since a 3-D visualization environment can be extremely difficult to work in, especially if the scaling, amplitude attributes, or 3-D geometry are not well understood.

Essentially, any attribute response or waveform can be visualized with a predetermined color response, or color signature, identical to a synthetic modeled response. For example, the signature for fault events in a typical coherency cube will generally fall within a very compressed and narrow color range represented in linear amplitude with an 8-bit color scale. Using dynamic scaling techniques, selected magnitude ranges can be enhanced through dB scaling, thus producing better data for visualization of the objectives, i.e., the fault system.

Other examples where dynamic scaling might be used include the seed picking of channels complexes or fault systems by dB color signature based on coherency, reflectivity, or instantaneous phase volume attributes. In many cases, 1-D and 2-D modeling can be used with these attributes by extracting information from synthetic seismic to calibrate and verify the results of the volume seed detection. Also, seed detection of a predefined color signature in dB, versus seed detection of a simple range of voxel values would provide a greater level of accuracy and confidence in the final results.

Methodology and Prerequisites

Scientific discovery can be described as an iterative loop between a model (i.e., an abstract description of the phenomena) and actual observation of phenomena. Each of these two components is repeated, and a comparison of the experimental data, with the data produced by models are observed repeatedly, until convergence to the most probable model is reached. The trick to using this approach economically is related to the rate at which models and observations can be made.

With recent improvements in seismic data acquisition, processing and modeling, and by using technology such as controlled phase and amplitude processing, attribute analysis and visualization, the ability exists to use seismic data for predicting and visualizing reservoir properties. It is assumed that attribute relationships can be determined from the data directly based on model results and calibration. If attribute relationships are found which are not directly related to the calibration model, then the phenomenon must be interpreted independently, and visualization is used only to enhance the interpreter's predictions of the subsurface characteristics.

The technique requires an integrated work model with seismic processors, interpreters, geophysicist, petrophysicist, and modelers working together to provide the greatest amount of confidence in the final products. Procedures are done in parallel and include enhancing the seismic data over the target zone, wavelet extraction, petrophysical modeling changes in reservoir properties, and identifying attributes that can detect modeled changes in synthetics using geophysical modeling. Then, attributes can be extracted from the data to predict changes in rock and fluid properties away from wells based on model results. Once the attribute numeric ranges are identified, and data scaled, then using direct visualization methods various attributes can be mapped by identifying values on a calibrated attribute color scale, and then enhanced using visualization technology.

Physical rock properties in target areas must also produce a detectable seismic response when preparing 1-D synthetic models, and synthetics must accurately tie the seismic in target locations. Also, changing log properties, such as fluid content, porosity, and/or sand percentage must also produce a detectable change in the seismic response as a basis for prediction and calibration. Geologic settings which might be suited for this procedure include carbonate porosity plays, Identification of fluid contacts, thickness change identification, and predicting sand percentage changes within sediment packages.

Application Requirements

The technique of the present invention is ideally suited for any 3-D surveys over fields where both seismic and log data are of good quality, with at least three suites of different well logs, and with controlled phase and amplitude processed seismic data. Once migrated data is obtained in 32-bit SEGY format, pre-interpretation data enhancement processes can be run to improve the data quality in the target zone, if possible, and extract precise wavelets for synthetic modeling. A VSP might also be needed to compute Q in the area, confirm the synthetic tie and check the velocities. The typical logs that would be needed in the process include sonic, density, gamma ray, SP, caliper, and core data. Check shots would be necessary to obtain the best seismic time tie, and key formation tops need to be identified for modeling constraints. When proper log data is not available, petrophysical modeling should be done to generate representative synthetic sonic and density log curves.

If depth conversion or depth migration is desired, then additional data requirements would include a stack volume, selected CDP gathers from velocity estimation lines, and the stacking or DMO velocities used to produce the original time migration. Previous interpretations should also be included if they can be used for model building, depth conversion, or processing. Also, coordinate information for locating all data will be needed, which includes X, Y, Z and geometry data for seismic, well coordinates, cartographic data, and well deviation data.

Synthetic Wavelet Calibration Procedures

In order to build synthetic models which accurately tie the seismic data amplitudes in both amplitude character and phase, a wavelet calibration procedure must be done. Wavelets are easily extracted and exported for use with other modeling software applications. Also, to minimize voxelized differences in the synthetics and seismic, the synthetic data are first scaled to match the AABV (average absolute value) of the seismic amplitudes in the target locations, and residual phase adjustments are made to the synthetic if necessary, such as forward Q compensation or constant phase rotations, to match the seismic phase and waveform as accurately as possible.

From 3-D seismic, 2-D Recon cuts that intersect multiple well locations are best suited for testing and describing the geologic framework. Also, Recon lines are easily extracted from systems with standard interpretation software, and re-extraction can be done for the same Recon location, when the use of multiple classes of enhanced seismic data volumes are needed. If multiple signal processed volumes are used, then it is usually necessary to perform wavelets calibration more than once, to supply the varying pulses needed to make the multiple synthetic models, with each model representing a waveform from a different processed versions of the seismic data.

Interpretation, Attribute Extraction and Attribute Analysis

The first step in the interpretation process is to visually scan the initial data volume to identify all obvious geologic features or anomalies, geared towards fast reconnaissance of potential leads. The initial seismic volume should be scaled using a conservative scale factor designed to minimize or prevent volume clipping. The cube is also loaded into an interpretation system, and interpretation can be performed in the usual manner. However, interpretation can be done much more rapidly, since Voxel seed detection with visualization is more efficient and accurate than a human digitizing events, and the results are easily transferred to other software applications.

Once the interpretation of key horizons has been completed, programs are used to extract a set of interval and spatial attributes which have also been identified and measured on the synthetics during the modeling processes. Statistical analysis between extracted attributes and/or attributes modeled at multiple well locations is performed using cross-plot relationships, which are then used to identify meaningful relationships between seismic attributes and reservoir properties. These relationships can be calibrated to predicted reservoir properties in terms of a color signature or magnitude relationship that can be used in visualization to get fast interpretation results

Well Log Processing

Logs are processed in a normal manner to compensate for bore hole information, and a suite of logs suitable for the petrophysical log modeling process is output. A normal set of logs might include sonic, gamma ray, and density. A fmal set of edited logs are exported, where a stratigraphic framework can be modeled and/or reservoir properties altered so that attributes can then be calibrated from modeled synthetics.

Seismic Attribute Modeling

Starting from the edited well-log data, a stratigraphic framework model is built to represent geology patterns in the target zone. Next, geologic properties are changed within the model such as porosity, percent sand, and fluid content. These models are then used to compute velocity, density, and acoustic impedance response from the reservoir properties, which are subsequently used to make synthetic seismic traces from pseudo log data. The synthetic traces are made using a variable phase pulse extracted directly from the seismic data, and the synthetic must be scaled to match the AABV of the seismic data.

A quality control or QC check is performed after scaling, by inverting the scaled synthetic trace and comparing the inverted impedance response with original impedance used to compute the synthetic before scaling. The traces are then loaded into an analysis package to extract all usable attributes. Results can be graphed using cross-plots to derive relationships between changing attributes versus the modeled geologic changes. Attribute scales can then be made which are calibrated to both the seismic pulse and amplitude ranges, and modeled geologic properties.

Statistical Wavelet Extraction

The wavelet, used to make the model synthetics for calibration, is extracted in conjunction with the pre-interpretation seismic data enhancement process. Once the seismic data is phase rotated to zero phase (or constant phase), and wavelet shaped for optimum interpretation character, then a zero phase pulse can be extracted or any number of available packages. For constant phase pulses, such as quad phase, a zero phase pulse is extracted and then phase rotated. The resulting pulse extracted from the enhanced data is then processed, using a technique such as InterWell, by running a Variable Phase analysis to further increase the correlation of the well tie. The resulting variable phase pulse will then be used to make synthetics for the attribute calibration process and for other 3-D inversion process requiring wavelet calibration.

Post-Migration Target Oriented Data Enhancement

The data enhancement procedure is started by selecting tie lines for testing and generating synthetics from logs using canned pulses or initial seismic pulse estimates. Using spectra analysis, the usable signal bandwidth is estimated, and noise content identified. Next, the test data is filtered to reduce noise and enhance the signal, phase rotated by a constant, wavelet shaped, and then scaled until the re-extracted pulse produces the best synthetic tie possible compared to the enhanced seismic data. The above procedure is repeated until the best zero phase synthetic tie is achieved. Once optimum processing parameters are selected, the 3-D volume is processed in the same way and output in SEGY for application data loading.

Ideally, this procedure should help stabilize spatially variant wavelet problems in the cube, and produce the maximum dynamic range and interpretability over the target zone. Also, this should best match the character and amplitude ranges of the modeled synthetics, so there is a direct relationship to the attribute calibration scales and underlying changes in reservoir properties. Several real examples of the Pre-Interpretation Target Oriented Data Enhancement procedure have been done, and in all cases, the interpreter felt that the changes in data quality were significant enough to alter interpretations, and would definitely result in a variation of the attributes extracted from the seismic intervals.

1-D Synthetic Model Processing

Synthetic seismic traces from well log data are made to tie the actual seismic data. The log data should be datumed to match the seismic datum, and check shots should be used to obtain the closest time tie with the seismic. Formation tops should also be placed on the plots to clearly identify the geologic interfaces in relation to the seismic wave form. Pulses used to make the synthetics are obtained in the seismic data enhancement process and final wavelet extraction process. The pulse used in the synthetics for attribute modeling will usually be non-causal and asymmetric, but close to zero phase.

Once the final seismic tie synthetics are made from the edited log data, the computed time impedance log can be output in ASCII format for additional attribute calibration, and the synthetic trace would be output in SEGY format so that scaling or additional processing can be done to match the seismic AABV amplitude range and waveform character. The scaled synthetics are then voxelized using the target oriented scale factors. Next, they are loaded into an interpretation system and used in conjunction with the visualization software applications to help guide the visual interpretation, as well as providing attribute calibration control data for the interval attribute analysis.

Important Technology Considerations

Methodology for interpreting 3-D seismic data has advanced beyond the traditional 3-D interpretation techniques, which consists of interpreting multiple closely spaced 2-D profiles extracted from 3-D seismic volumes, and generating 3-D structural maps. With advanced visualization and data analysis techniques, the geoscientist is able to quickly identify and prioritize key areas and focus their attention in order to extract the greatest early benefit from the large volumes of data reviewed.

Making use of today's sophisticated computing resources, and employing new visualization and data analysis techniques, geoscientist are now able to easily see volumes of data in three dimensions and identify features such as faults, shallow amplitude anomalies, complex channel systems, structural detail, and fluid contacts; features which might be easily overlooked using less rigorous 3-D seismic interpretation techniques.

Having the ability to visualize numerous volumes of data or attributes simultaneously, using predetermined scales, with calibration and opacity techniques will greatly accelerate the scientists ability to recognize problems in synthetic models or actual data. Ultimately, using the integrated visualization concepts described in the above processes, we will be able to produce images containing all the information needed to make a final decision for drill locations; but in a fraction of the amount of time required with traditional methods.

Workflow Integration

The ability to define an effective and efficient work flow process increases when using visualization technology in conjunction with 3-D seismic interpretation and other geoscience technologies such as petrophysical and geophysical modeling, and seismic data processing. A worthwhile integration strategy should be carefully planned, provide a work flow which moves the process smoothly between interpretation, analysis, visualization, and modeling, while simultaneously increasing the speed and accuracy of interpretations, thus enabling scientist to develop a better understanding of a reservoir's character and complexity. A complete description of the integration strategy will be documented in a separate report.

Technical Summary

The graphs, FIGS. 9 through 14, are used to illustrate the source of, and sensitivity of, dynamic range loss that results when compressing data to 8-bits. The graphs shown in FIGS. 13 and 14 are also used to analyze and identify changes the Voxel visualization color relationships, which exist between original 3-D seismic and/or model amplitude values.

FIGS. 9 and 10 together clearly illustrate effect of amplitude binning and how this is related to losses in dynamic range, depending on the target objective optimized. Collectively, this illustrates how amplitudes can be voxelized and manipulated to emphasize predetermined waveforms using Dynamic Scaling for Calibration Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method for imaging volume data having an embedded target of interest comprising the steps of:
    (a) acquiring data concerning the target,
    (b) preparing the data for identifying an event associated with the target,
    (c) calibrating the data to a known model, and
    (d) scaling the data to emphasize the event such that the data can be viewed and the event associated with the data are readily discernible.

2. The method for imaging volume data having an embedded target of interest as defined in claim 1 wherein the step of preparing the data for identifying an event associated with the target comprises the step of rendering the event viewable without distortion.

3. The method for imaging volume data having an embedded target of interest as defined in claim 1 wherein the step of preparing the data for identifying an event associated with the target comprises the step of capturing a wavelet having relevant amplitude data with respect to the relevant event.

4. The method for imaging volume data having an embedded target of interest as defined in claim 3 wherein the step of preparing the data for identifying an event associated with the target comprises the step of capturing a wavelet having relevant phase data with respect to the relevant event.

5. The method for imaging volume data having an embedded target of interest as defined in claim 1 wherein the step of preparing the data for identifying an event associated with the target comprises the step of imaging and migrating the data for placing the event in the correct position.

6. The method for imaging volume data having an embedded target of interest as defined in claim 4 further comprising the step of tying the wavelet captured from the data to a wavelet of the known model.

7. The method for imaging volume data having an embedded target of interest as defined in claim 6 further comprising the step of analyzing the dynamic range of the model data and the captured data to confirm alignment.

8. The method for imaging volume data having an embedded target of interest as defined in claim 7 further comprising the step of s electing a scale factor to emphasize the event.

9. The method for imaging volume data having an embedded target of interest as defined in claim 8 further comprising the step of viewing the event in at least one of log amplitude scale format and linear amplitude scale format.

10. The method for imaging volume data having an embedded target of interest as defined in claim 9 wherein the step of viewing the event in log amplitude scale format comprises viewing the event in dynamic range data format.

11. The method for imaging volume data having an embedded target of interest as defined in claim 9 wherein the step of viewing the event in linear amplitude scale format comprises viewing the event in linear 8-bit data format.

12. A method for imaging volume data having an embedded target of interest comprising the steps of:
    (a) acquiring data concerning the target,
    (b) preparing the data for identifying an event associated with the target such that the event is viewable without distortion, and preparing the data further comprises:
        (1) imaging and migrating the data for placing the event in the correct position, and
        (2) capturing a wavelet having relevant amplitude data and phase data with respect to the relevant event, (c) calibrating the data to a known model comprising the steps of:
  (1) tying the wavelet captured from the data to the known model, and
  (2) analyzing the dynamic range of the model data and the captured data to confirm alignment,
(d) scaling the data to emphasize the event such that the data can be viewed and the event associated with the data are readily discernible.

13. The method for imaging volume data having an embedded target of interest as defined in claim 12 further comprising the step of viewing the event in at least one of log amplitude scale format and linear amplitude scale format.

14. The method for imaging volume data having an embedded target of interest as defined in claim 13 wherein the step of viewing the event in log amplitude scale format comprises viewing the event in dynamic range data format.

15. The method for imaging volume data having an embedded target of interest as defined in claim 13 wherein the step of viewing the event in linear amplitude scale format comprises viewing the event in linear 8-bit data format.

16. A seismic evaluation method comprising the steps of:
  (a) providing high resolution data of a volume by one of signal process filtering or interpolation programs to enhance visual characteristics,
  (b) scaling the volume as needed to delineate subtle changes in seismic wave forms along geologic horizons of interest for providing contrast for visualization, and
  (c) processing and calibrating the data comprising the steps of:
    (1) optimizing the dynamic range of the amplitudes representing events of interest, and
    (2) determining the color signatures for the events of interests.

17. A method for imaging volume data having an embedded target of interest comprising the steps of:
  (a) acquiring data concerning the target,
  (b) preparing the data for identifying an event associated with the target such that the event is viewable without distortion, and preparing the data further comprises:
    (1) imaging and migrating the data for placing the event in the correct position, and
    (2) capturing a wavelet having relevant amplitude and phase data with respect to the event,
  (c) calibrating the data to a known model comprising the steps of
    (1) tying the wavelet captured from the data to the known model, and
    (2) analyzing the dynamic range of the model data and the captured data to confirm alignment,
  (d) scaling the data to emphasize the event such that the data can be viewed and the event associated with the data are readily discernible,
  (e) displaying the event in at least one of log amplitude scale format and linear amplitude scale format, and
  (f) if displaying the event in log amplitude scale format, displaying the event in dynamic range data format, and
  (g) if displaying the event in linear amplitude scale format, displaying the event in linear 8-bit data format.

* * * * *